United States Patent
Savarese et al.

(10) Patent No.: US 9,005,047 B2
(45) Date of Patent: Apr. 14, 2015

(54) APPARATUSES, METHODS AND SYSTEMS RELATING TO SEMI-AUTOMATIC GOLF DATA COLLECTING AND RECORDING

(75) Inventors: Chris Savarese, Danville, CA (US); Noel H. C. Marshall, Gerringong (AU); Susan McGill, Redwood City, CA (US)

(73) Assignee: Tag Golf, LLC, Ridgeland, MS (US)

( * ) Notice: Subject to any disclaimer, the term of this patent is extended or adjusted under 35 U.S.C. 154(b) by 243 days.

(21) Appl. No.: 12/258,348

(22) Filed: Oct. 24, 2008

(65) Prior Publication Data
US 2009/0111602 A1    Apr. 30, 2009

Related U.S. Application Data

(60) Provisional application No. 60/982,713, filed on Oct. 25, 2007.

(51) Int. Cl.
| | | |
|---|---|---|
| A63B 53/00 | (2006.01) | |
| A63B 57/00 | (2006.01) | |
| G01S 19/19 | (2010.01) | |
| A63B 24/00 | (2006.01) | |
| A63B 71/06 | (2006.01) | |
| A63B 69/36 | (2006.01) | |

(52) U.S. Cl.
CPC .............. *G01S 19/19* (2013.01); *A63B 24/0021* (2013.01); *A63B 71/0605* (2013.01); *A63B 69/3611* (2013.01); *A63B 2024/0031* (2013.01); *A63B 2024/0037* (2013.01); *A63B 2071/0611* (2013.01); *A63B 2220/12* (2013.01); *A63B 2220/17* (2013.01); *A63B 2220/20* (2013.01); *A63B 2220/30* (2013.01); *A63B 2220/35* (2013.01); *A63B 2220/62* (2013.01); *A63B 2220/836* (2013.01); *A63B 2225/20* (2013.01); *A63B 2225/50* (2013.01); *A63B 2225/54* (2013.01)

(58) Field of Classification Search
USPC ....................... 463/2; 473/222, 407
See application file for complete search history.

(56) References Cited

U.S. PATENT DOCUMENTS

| | | |
|---|---|---|
| 4,910,677 A | 3/1990 | Remedio et al. |
| 5,086,390 A | 2/1992 | Matthews |
| 5,127,044 A | 6/1992 | Bonito et al. |
| 5,283,733 A | 2/1994 | Colley |
| 5,298,904 A | 3/1994 | Olich |
| 5,507,485 A | 4/1996 | Fisher |
| 5,740,077 A | 4/1998 | Reeves |
| 6,030,109 A | 2/2000 | Lobsenz |
| 6,118,376 A * | 9/2000 | Regester .................... 340/568.6 |
| 6,173,610 B1 * | 1/2001 | Pace ................ 73/493 |
| 6,582,328 B2 | 6/2003 | Kuta et al. |
| 6,705,942 B1 | 3/2004 | Crook et al. |
| 6,908,404 B1 | 6/2005 | Gard |

(Continued)

*Primary Examiner* — Kang Hu
*Assistant Examiner* — Syvila Weatherford
(74) *Attorney, Agent, or Firm* — Blakely, Sokoloff, Taylor & Zafman LLP

(57) ABSTRACT

Apparatuses, methods and systems relating to golf data collecting and recording are described. In one embodiment an apparatus on a golf club includes an integrated reminder and a stroke cancellation system and is semi-automatic in that the recording of the stroke is directly in response to changing the state (e.g. activating) of a switch which indicates that the golfer has pressed a button on the golf club. The pressing of the button indicates that the golfer will or has taken a stroke with the golf club and that the stroke is to be recorded, optionally with the location of the stroke and an identifier of the club (e.g. 9 iron).

17 Claims, 20 Drawing Sheets

(56) References Cited

U.S. PATENT DOCUMENTS

| | | |
|---|---|---|
| 7,118,498 B2 | 10/2006 | Meadows et al. |
| 7,121,962 B2 | 10/2006 | Reeves |
| 7,143,639 B2 | 12/2006 | Gobush |
| 7,207,902 B1* | 4/2007 | Hamlin ........................ 473/353 |
| 2001/0045904 A1 | 11/2001 | Silzer Jr. |
| 2002/0004723 A1* | 1/2002 | Meifu et al. ...................... 705/1 |
| 2002/0077189 A1* | 6/2002 | Tuer et al. ..................... 473/151 |
| 2002/0177490 A1 | 11/2002 | Yong et al. |
| 2002/0188359 A1 | 12/2002 | Morse |
| 2003/0191547 A1* | 10/2003 | Morse ............................ 700/91 |
| 2004/0014531 A1* | 1/2004 | Ziener-Gundersen ........ 473/222 |
| 2004/0073325 A1* | 4/2004 | Reeves ............................ 700/91 |
| 2004/0147329 A1 | 7/2004 | Meadows et al. |
| 2005/0268704 A1 | 12/2005 | Bissonnette et al. |
| 2005/0272516 A1 | 12/2005 | Gobush |
| 2006/0178110 A1* | 8/2006 | Nurminen et al. ........... 455/41.2 |
| 2006/0270450 A1 | 11/2006 | Garratt et al. |
| 2007/0129178 A1 | 6/2007 | Reeves |
| 2007/0135237 A1 | 6/2007 | Reeves |
| 2007/0285214 A1* | 12/2007 | Rotzoll ........................ 340/10.34 |
| 2008/0136775 A1* | 6/2008 | Conant ........................ 345/156 |

* cited by examiner

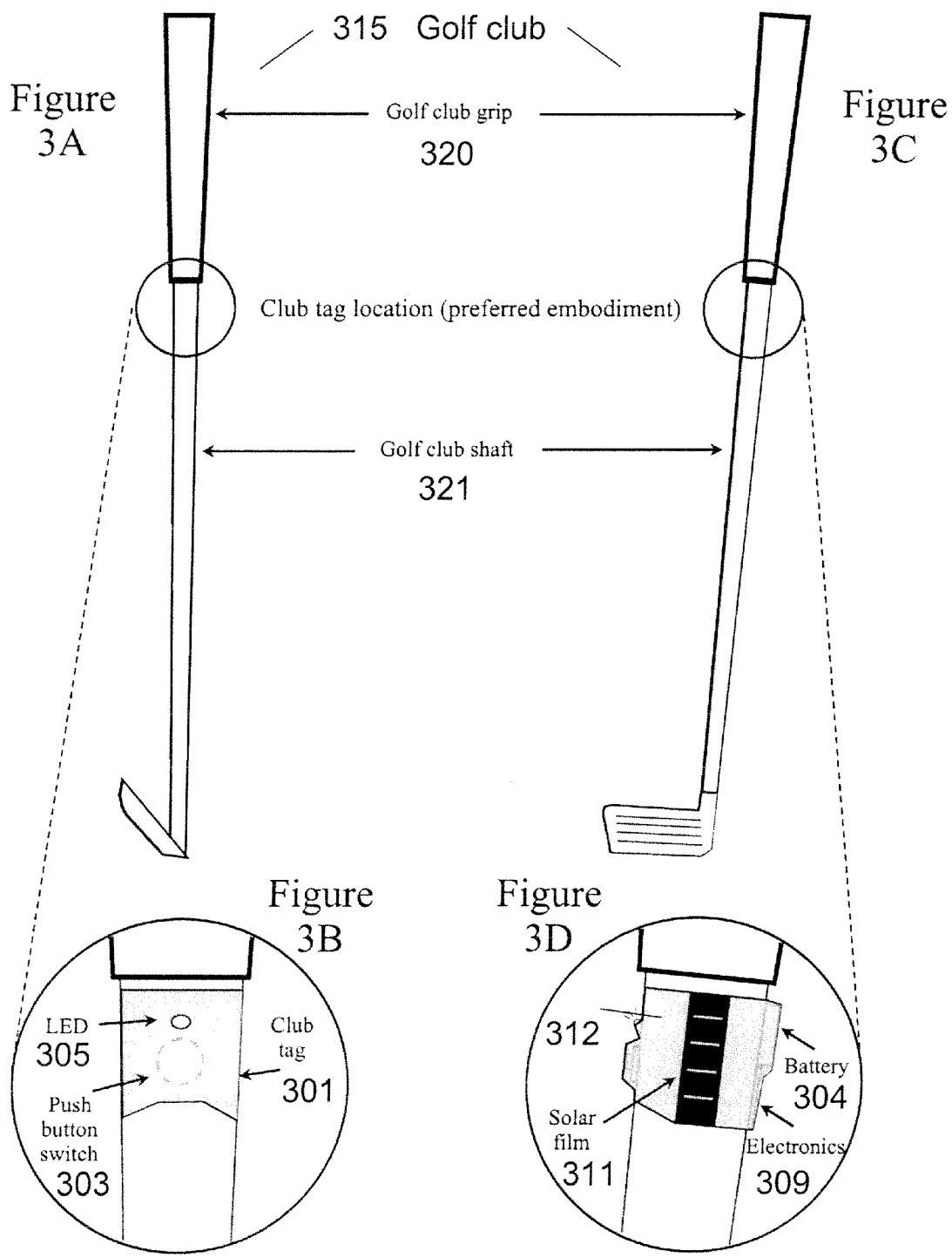

OPTION 3

Wireless Internet / User Interface device in one housing and GPS/RFID device in a separate housing

Note: with this option the golfer could choose to not wear (or keep in close range) the Internet device during play.

INTERNAL MODULE

ANTENNA

Figure 18A

Preparing to Use the System

| Golfer purchases system. The parts of the system are 1) GPS and RFID device, 2) RFID tags for golf clubs. The parts could be sold separately or bundled in different configurations. In a preferred embodiment the device is sold bundled with the RFID tags, and the RFID tags are configured to communicate with that particular handheld. |

↓

| Golfer applies RFID tags to the shafts of the golfer's clubs. The RFID tags are pre-coded with specific standard club names, for example "Driver" and "3-Iron". |

↓

| The handheld device recognizes RFID club tags provided and displays the list of golf clubs. The golfer may edit the name of any club. |

↓

| Golfer attaches the GPS and RFID device to the golfer's body. e.g. on the belt or in the front pocker in on embodiment of the device. |

↓

| The golfer turns on the device and proceeds to play golf. |

Figure 18B

System In Use

The golfer wears the RFID and GPS device during play. The RFID receiver/transceiver is in a low-power mode, e.g. receiving at a slower rate.

The golfer activates the RFID tag on the golf club, indicating that a stroke is occuring.

The RFID receiver detects the transmitted code and turns the receiver on in full-power mode. The receiver receives the transmitted information, which includes the identification for the club type, the command to mark the location and the command to register a golf stroke.

Figure 18C

Preparing to Use the System

| Golfer purchases system. The parts of the system are 1) GPS and RFID device, 2) RFID tags for golf clubs. The parts could be sold separately or bundled in different configurations. In one embodiment, the RFID tags are supplied in a random manner, with no predetermined identifier. |

↓

| Golfer applies RFID tags to the golfer's clubs. The RFID tags are randomly coded. |

↓

| Each tag is initiated to the handheld device by holding the tag in close proximity to the device and activating the tag switch. Then handheld receives the ID code and prompts the golfer to enter information about this golf club. The handheld may provide a list of club names to choose from. Alternatively, the golfer may enter a custom name of the clug with alpha-numeric characters selected on the handheld. |

↓

| Golfer attaches the GPS and RFID device to the golfer's body, e.g. on the belt or in the front pocker in on embodiment of the device. |

↓

| The golfer turns on the device and proceeds to play golf. |

APPARATUSES, METHODS AND SYSTEMS RELATING TO SEMI-AUTOMATIC GOLF DATA COLLECTING AND RECORDING

This application claims the benefit of U.S. Provisional Patent Application No. 60/982,713, filed Oct. 25, 2007.

FIELD OF THE INVENTION

The present invention relates to the game of golf or other games, and more particularly to an improved semi-automatic golf data collecting and recording system.

BACKGROUND OF THE INVENTION

GPS rangefinders are popular in the game of golf. GPS rangefinders are used to inform the golfer of the golfer's location on a golf course relative to the location of other mapped areas of interest on the course (e.g. sand traps, greens, etc.) GPS rangefinders are typically available in either cart-mounted or handheld versions.

Examples of popular cart-mounted GPS rangefinder products include Prolink and UpLink. Examples of popular handheld GPS products include the SkyCaddie by SkyHawke and Golflogix, to name a few. A potentially valuable feature of handheld GPS rangefinders is the ability for the golfer to "mark the location" of the ball and other areas of interest. With existing handheld systems the golfer is able to press a button on the handheld devices to mark the location of the ball. Similar technology could be implemented in cart-mounted GPS systems, but the handheld systems have the advantage of the golfer being able to walk to the actual location of the golf ball to mark the location. Often golf carts are restricted to "cart path only" access on a golf course and it is often not practical to drive a golf cart to the actual location of a golf ball due to the terrain.

Marking the location of the ball provides valuable information to the golfer. The current handheld systems operate in approximately the following manner: When the golfer hits the first (tee) shot of a hole the golfer presses a button on the handheld device instructing the device to "mark the spot" where the drive was hit. The device records the GPS coordinates of the first shot. The golfer may manually enter, through a manual input interface, other information on the device such as: type of club used (e.g. driver, 5 iron, etc.), type of contact made with the ball (e.g. hook, slice, straight), wind conditions, etc. The current method to enter such data consists of the golfer making selections on the device by pressing buttons, selecting items from drop down menus, etc.

After the golfer hits the first shot, records the location of the first shot and enters data about the first shot the golfer approaches the ball at rest for the next shot. If the golfer follows the same pattern as the first shot (i.e. hitting the ball, marking the spot of the shot on the device, entering other information) the GPS system can store and display the locations of the first and second shots and calculate the distance of the first shot. If this pattern is continued for every shot of the round the golfer would have very valuable data about the golf round including: distance of all shots, locations of all shots and (if entered), type of contact made on all shots, wind conditions for all shots, etc. The golfer would also know the number of strokes taken per hole which (if accurately recorded) would be the golfer's score for the round. However golfers seldom use the features because the process of manually entering data is too labor intensive on a golf course and will lengthen the duration of each golf shot, causing delays in the game. Further, if a data collection system requires action by the golfer it is likely the golfer may forget to take action on every stroke. If the golfer forgets to take action to record a stroke or multiple strokes the system provides the golfer inaccurate data. Further, if the golfer attempts to return to the approximate location where the golfer forgot to record the golf stroke this would result in further slowing down of play which is bad for the game of golf. Patents exist that describe GPS systems with methods for collecting and managing data. Both U.S. Pat. No. 6,582,328 (Golflogix) and U.S. Pat. No. 7,118,498 (SkyHawke) describe such systems that require the golfer to enter golf shot data.

The problem with existing systems is golfers do not want to manually record the data for golf strokes into a handheld device. It is inconvenient for golfers to take the time to look at a handheld device, press buttons, select from drop-down lists, etc. to record information about every golf shot. One could say it is impractical for golfers to do so. Further, if golfers took the time to enter data in such a manual manner it would result in slower play which is not good for the golfers or the golf courses. It is desirable to have a completely automatic system for collecting golf data. U.S. Patent Application No. 60/949,458 describes such a system. The system described in this patent application includes means of detecting motion of the golf ball to confirm when an actual golf stroke has occurred. Such a system requires modification to the golf ball.

The problem of requiring the golfer to enter data manually is known. U.S. Pat. No. 7,121,962 and U.S. Patent Application Publication Nos. 2007/0135237 and 2007/0129178 (all by Reeves) teach solving the problem using telemetry equipped golf clubs. The solutions taught by Reeves are impractical and fail to address all the issues required to accurately collect and record golf data. Reeves teaches entering data on a handheld device to record golf data, which is not good for the game because it would slow down play. Reeves teaches golf clubs with unique holes in or near the club head that make unique whistling sounds during the golf swing to identify each club. This approach is not practical due to variations in swing speed, wind and other noise variations that would make the system unreliable. Reeves teaches the use of a microphone housed in the handheld device to hear the clicking sound when the club hits to the ball to record the location of the stroke. This does not take into account practice shots between holes and other clicking sounds when clubs hit objects and would be prone to errors. Further, Reeves teaches requiring expensive and sophisticated electronics on the golf club (i.e. motion detector, and accelerometer). The expense of such components makes for an impractical solution.

U.S. Pat. No. 6,030,109 teaches a system for counting strokes automatically by detecting the distinctive sound made by a ball contacting the club face during a hit. The system disclosed seems to be problematic and potentially ineffective for several reasons. Similar to Reeves, this patent confirms a golf stroke by the sound made by the club striking the ball. Because golfers will often hit balls between holes for practice and hit other objects that might sound similar to hitting a ball the system will be prone to errors. A further potential problem relates to the insensitivity to a very gentle putt that generates no characteristic sound pattern. Finally, this system requires the golfer to wear an ankle strap with a microphone in it which golfers will likely not want to wear.

US Patent Application Publication No. 2006/0270450 teaches a voice activated system for collecting and recording golf data. This system requires action (verbal instruction) by the golfer for each golf action to be recorded. Therefore the system does not automatically record golf data. Golfers may not like having to speak instructions for every action to be recorded. Further, golfers may forget to verbally instruct the recording of golf strokes which could result in attempts to return to locations where data was not recorded, slowing down play.

U.S. Pat. No. 7,143,639 and US Patent Application Publication No. 2005/0272516 teach a golf launch monitor that uses RFID tags in golf balls and golf clubs to automatically identify the clubs and balls and to trigger a camera-based launch monitor system. U.S. patent application Ser. No. 10/672,365, filed Sep. 26, 2003 teaches passive RFID in golf balls and the identifying of such golf balls by a RFID reader.

Other examples of related prior art for golf data collection and management systems include: U.S. Pat. Nos. 6,705,942, 5,086,390, 4,910,677, 5,127,044, 5,283,733, 5,298,904, 6,908,404 and US Patent Application Publications 2002/0177490, 2002/0004723, 2001/0045904, 2002/0188359, 2005/0268704, 2005/0272516 and 2004/0147329.

Golf data collection systems will provide golfers with rich data about their golf game but existing systems and systems taught in the prior art above have shortcomings or challenges. The systems described above require either: 1) a modification to the golf ball, 2) expensive and sophisticated electronics on the golf club, 3) the golfer remembering to take an action to record every golf stroke (without a reminder) and 4) the golfer wearing an ankle strap with a microphone in it which golfers will likely not want to wear. Some of the prior art systems have technical challenges, such as relying on sound made by the club striking the ball to record every stroke—which may not be technically feasible for all strokes, particularly putts.

SUMMARY OF THE DESCRIPTION

Apparatuses, methods and systems relating to semi-automatic golf data collecting & recording are described herein. In one embodiment, RFID-enabled golf clubs including a stroke recording reminder and cancellation system operatively coupled to a golf GPS (Global Positioning System or other satellite positioning system) device with an integrated RFID receiver allowing for semi-automatic recording of when and where golf strokes occur.

There is a need for a system that overcomes problems with prior systems. A golf data recording system in one embodiment that does not require modification to the ball and includes inexpensive and simple electronics on the golf club is described herein. The system in one embodiment includes a reminder for the golfer to take an action for each stroke. The system does not require the golfer to enter data on a handheld device (e.g. a handheld GPS device). The system does not require the golfer to wear a microphone strapped to the ankle. The system allows the golfer to manually confirm the location of the golf stroke and the club being used for the stroke by pressing a button on the golf club. The system will provide reliable data without slowing down the game.

In one exemplary embodiment of an aspect of the invention, a GPS device is coupled with a RFID receiver or transceiver. Active RFID-tagged golf clubs communicate wirelessly with the GPS/RFID device allowing for accurate recording of golf data. This communication can occur in response to the golfer's activation of a switch on the tagged golf club, and no interrogation of the RFID tag is needed in this embodiment.

A handheld GPS unit, in one embodiment, has a RFID receiver or transceiver integrated within the same housing. The handheld unit can be worn by the golfer on a belt clip. It can be small enough to be stored in, for example, the front pants pocket. It could also be stored near enough to the golfer to record approximate location of golf strokes. For example, the golfer could clip the device to the golf carry bag or golf cart.

Golf clubs are equipped with active RFID tags in one embodiment. Each tag includes a switch (i.e. push button or membrane switch), a power source, RF transmitter, an antenna and a micro-processor with the ability to store a code describing the type of club.

In one exemplary embodiment of an aspect of the invention, each golf club tag includes at least one way of reminding the golfer to record the golfer's location and club selection before executing the golf stroke. For example, each tag has a visual indicator (e.g. a light emitting diode/LED or liquid crystal display/LCD) coupled to a small photovoltaic (solar) cell. The solar cell provides power to the LED. When the golf club is removed from the golf bag and exposed to the light the LED illuminates or blinks. The golfer must, in one embodiment, press the button on the tag to turn off the LED. When the golfer presses the button, the club tag transmits a signal to the integrated GPS & RFID unit to: 1) mark the location, and 2) record the club code, and 3) record the golf stroke. In an additional embodiment, the golfer can choose the option of how the LED illuminates, by blinking or continuously on, or off. In another embodiment, the LED may stay off until the button has been pushed, then the LED may blink as a confirmation that the button has been pushed.

The club tag is located in an orientation such that the golfer will see the illuminated or blinking visual reminder before executing each golf stroke. In one exemplary embodiment of an aspect of the invention the club tag is located immediately under the golf club grip or handle, on the golf club shaft. In another exemplary embodiment the club tag is located at the butt-end of the golf club grip. The button and visual reminder (e.g. LED) are oriented to be facing up toward the golfer when the golfer has positioned the club adjacent to the ball at the beginning of a stroke (e.g. as shown in FIG. 2B), within easy reach of the golfer's thumb or fingers. With the visual reminder oriented in this way the golfer will always be reminded to push the button to turn off the visual reminder and record each stroke. Further, the fact that the club tag with push button is in either of these locations on the golf club allows the golfer to record each stroke quickly and easily, without the need to look at a screen on a handheld device or push buttons on a handheld device. The action required to record the stroke on the club tag is very minimal compared to the actions required to record a stroke on a handheld device (e.g. a handheld GPS device). For example, if recording a golf stroke requires looking at a handheld device and pushing buttons (or making selections from drop down menus) the golfer has to: 1) remove a hand from the golf club grip, 2) reach for the handheld device which is either clipped to the belt, in the pocket, or nearby clipped to a golf bag, 3) look at the screen, 4) press a button, 5) replace the handheld device, 6) replace the hand on the golf club grip. With the club tag the golfer can keep both hands on or partially on the grip and quickly press the button with the thumb or finger.

The system records, in at least certain embodiments:
Location of all shots
Type of club used for all shots
Distance of shots for specific clubs (this may be determined by the handheld GPS unit which calculates the distance between stored locations)
Number of strokes taken per hole/round
Number of putts per hole/round The golf data can be stored and analyzed over a round, year, or lifetime of golf. This information will be very valuable to the golfer. The golf data can be transferred to a storage device (e.g. a web server) which is connected to a network(s), such as the Internet.

In one embodiment, an apparatus for collecting golf data comprises a substrate to attach the apparatus to a golf club, a transmitter coupled to the substrate, and a switch coupled to the transmitter. The substrate may include an adhesive on one side to allow a user to attach the apparatus to the golf club. In another embodiment, the apparatus for collecting golf data comprises a mechanism attached to the butt-end of the grip of the golf club, a transmitter coupled to the mechanism, and a switch coupled to the transmitter. The mechanism is inserted into the vent hole of the golf club grip. The switch, when activated (e.g. its state, such as open or closed state, is changed), causes the transmitter to transmit a signal, directly in response to activation of the switch, which causes a golf data collection apparatus to record information that a stroke, using the golf club, was taken. The switch, when activated, can cause the recording of a stroke without requiring a separate ball hit detector such as a sound detector which detects the club hitting the ball. This apparatus may be supplied as part of a kit which includes several of these apparatuses, each intended for a separate golf club and each identifying, through an RFID tag, the corresponding golf club; the kit may further include a handheld golf data collection apparatus which wirelessly communicates with the transmitter by receiving signals from the transmitter. This apparatus may also include a display device, coupled to the substrate or mechanism, to remind the golfer to activate the switch to record the stroke, and may also include a solar energy source coupled to the display device to provide power to the display device which may be an LED or LCD device. This apparatus may also include a battery coupled to the transmitter to provide power to the transmitter and may also include, in at least certain embodiments, logic (e.g. a processor) coupled to the switch and to the transmitter, which logic is configured to determine whether a user activation of the switch indicates that a stroke is to be recorded (e.g. a single, short activation/press of a button) or canceled (e.g. a press and hold in the pressed state for a relatively prolonged period of time). In at least certain embodiments, activation of the switch causes the display device to enter, for a period of time, a lower power state after the user activates the switch.

One or more of the methods described herein may be performed by a portable golf data collection system 1501, shown in FIG. 15, which may include a memory, a location positioning system 1503 (which may be a GPS or other satellite positioning system receiver or a cellular radio communication system or a pseudolite receiver), a RF receiver 1507 and a processing system 1505. The system 1501 is one example of various different systems described herein. The location positioning system 1503 may include one or more antennas, such as antenna 1504, and may be a conventional GPS (global positioning system) receiver or other type of satellite positioning system receiver which receive positioning signals from satellites or pseudolites; in other embodiments, the location positioning system 1503 may be part of a cellular telephone positioning system which uses transmission times between cellular towers or basestations to determine the position of the cellular telephone positioning system. The memory (not shown in FIG. 15) is coupled to processing system 1505 to store data collected in the methods described herein, such as location of first golf stroke on hole #1 with club #X and location of second golf stroke on hole #2 with club #Y, etc. The memory may also store data representing a map or other two-dimensional position information about one or more golf courses, and this information may be used to help determine automatically when and where a golf stroke has occurred and hence record data, in the memory, about the golf stroke. The RF receiver 1507 includes one or more antennas, such as antenna 1506, which is configured to receive, along with receiving circuitry within the RF receiver 1507, RF signals from an RF tag in a golf club, such as RF tag 1513 (which includes at least one antenna 1514) and optionally RF signals from at least one RF tag in a golf ball, such as RF tag 1511 (which includes at least one antenna 1512), also shown in FIGS. 2A and 2B. The RF receiver 1507 shown in FIG. 15 may also, in certain embodiments, be configured to locate a lost golf ball by detecting RF signals from the lost golf ball and measuring received signal strength of those RF signals in order to guide the golfer to the lost golf ball. Those RF signals may be from a harmonic radar tag described in US Application Publication No. 2006/0122007 or an active, battery powered RF tag or a non-harmonic passive RFID tag. The system 1501 may be manually switched into a golf ball finding mode in order to activate the finding system and to pause the golf data collection system's use or processing of RF signals. The processing system 1505 is coupled to both the location position system 1503, which may be a GPS receiver, and to the RF receiver 1507, which may be an RFID transceiver to receive identifier codes from one or more golf balls and to receive an identifier code from a RF tag of a golf club.

The system 1501 may further include a networked data processing system which is coupled to a network or to the Internet and may include input/output devices, such as buttons and a touch screen input device which is integrated with a display screen, such as an LCD display. The system 1501 may be integrated in one housing or may be separated into several (e.g. two) housings for attachment to different parts of a golfer or otherwise positioned as described herein.

BRIEF DESCRIPTION OF THE DRAWINGS

The present invention is illustrated by way of example and not limitation in the figures of the accompanying drawings in which like references indicate similar elements.

FIGS. 3A, 3B, 3C, and 3D show attachment of one embodiment of the RFID tag to the golf club.

FIG. 18A is a flow chart showing an example of a method for setting up a system to automatically collect golf data; FIG. 18B is a flow chart showing an example of a method for semi-automatically collecting golf data related to the round of golf, such as location of stroke, club used and recording the stroke and score. FIG. 18C is a flow chart showing another example of a method for setting up a system to initialize random RFID tags to the handheld to semi-automatically collect golf data.

DETAILED DESCRIPTION

Figure 1A:
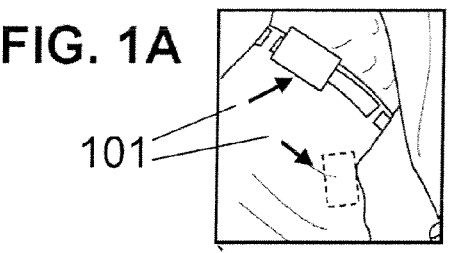
FIG. 1A shows an apparatus including a GPS receiver and RFID transceiver for collecting and recording golf data. The apparatus is shown clipped onto a golfer's belt or kept in the front pants pocket.
Figure 1B:
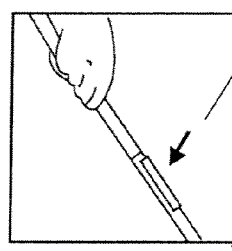
FIG. 1B shows a RFID tag on a golf club attached to the shaft of the club, immediately under the grip of the club.
Figure 1C:
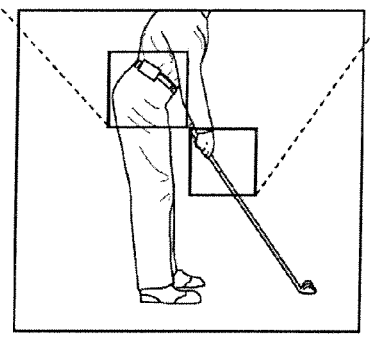
FIG. 1C is an expanded view showing the apparatus and the RFID tag on the club.
Figure 1D:
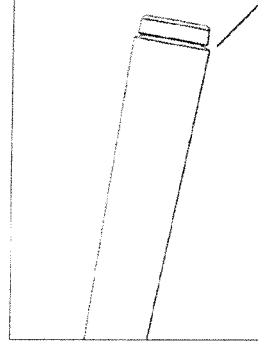
FIG. 1D shows a RFID tag on a golf club attached to the butt-end of the club grip.
Figure 2A:
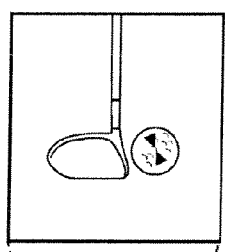
FIG. 2A shows a golf ball with indication that a RFID tag is inside the golf ball.
Figure 2B:
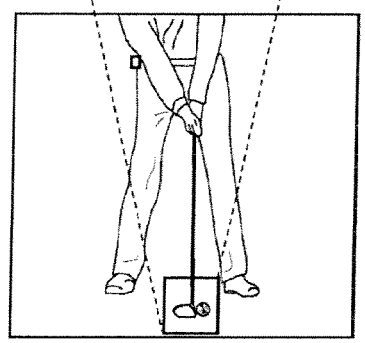
FIG. 2B shows a front view of a golfer addressing a golf ball with a RFID tag inside the golf ball.

The present invention is a Golf Data Collection System shown in FIG. 1C that consists of a handheld device shown in FIG. 1A and RFID tags shown in FIGS. 1B and 1D that are attached to a set of golf clubs. The handheld device 101 is a golf GPS device, such as the SkyCaddie, with additional functionality to communicate with the RFID tags 102 and 103. This system combines the GPS golfing and mapping technology of a golf GPS system with semi-automatic RFID tracking of golf equipment to provide data about a round of golf. The system tracks information about a round of golf, such as the club used for each golf shot, and the location of each golf shot overlaid on a map of the golf hole and the number of strokes or score.

One embodiment of this invention is shown in FIGS. 3A, 3B, 3C, 3D and 4A. A RFID tag 301 is attached to a golf club 315 below the grip 320. The RFID tag is made up of a power source, such as a battery 304, LED 305, switch 303, solar panel 311, and electronics 309 that include a RF transmitter, microprocessor, and antenna. The tag wraps around the shaft of the club as shown in FIGS. 3B and 3D. In FIG. 4, the RFID tag is shown in flat orientation before wrapping around the golf club shaft. The electronics are housed in a small enclosure as part of the tag that is positioned on the underside of the golf shaft as shown in FIG. 3D, so that it is not visible to the golfer and has minimal or no impact on the balance of the club. On the tag on the top side of the golf shaft is a LED and thin membrane switch accessible to the golfer as shown in FIG. 3B. The tag is covered with a resilient material 312, such as overmolding or plastic, that provides protection from dust, water, and mechanical shock. The resilient material gives the tag aesthetic appeal. The overmold has a window or cut-out over the solar cells.

Figure 5A:
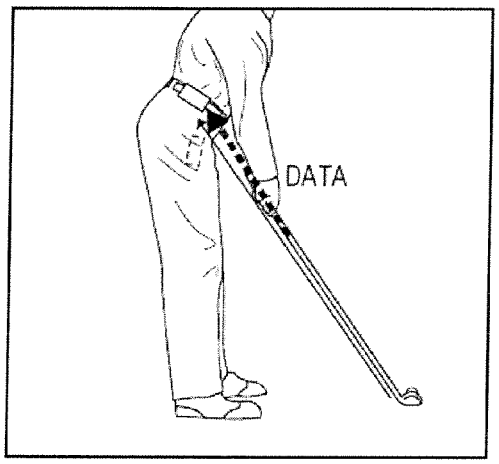
FIG. 5A shows a side view of a golfer wearing the apparatus and the apparatus receiving coded RF signals from the golf club tag (for data recording) and golf ball tag (for locating the ball).
Figure 5B:
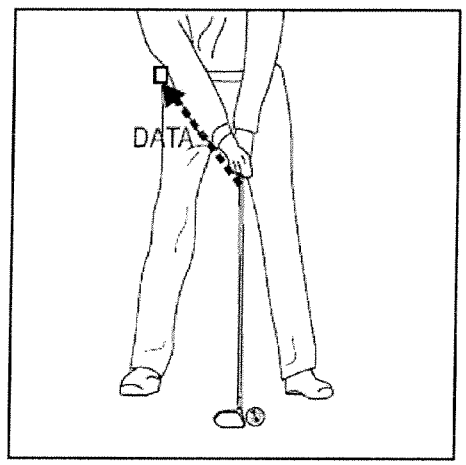
FIG. 5B shows a front view of a golfer wearing the apparatus and the apparatus receiving coded RF signals from the golf club tag (for data recording) and golf ball tag (for locating the ball).

The RFID tag is normally in the "off" position. When setting up for the golf stroke, the golfer presses the switch 303, which activates the electronics 309 in the tag. Upon activation, the tag transmits information to the handheld. This data communication is shown in FIGS. 5A and 5B. This communicated information includes club type and a command to mark the current location by GPS and a command to register a stroke. Optionally, there may be an audio response from the handheld confirming receipt of tag information.

Figure 3E:
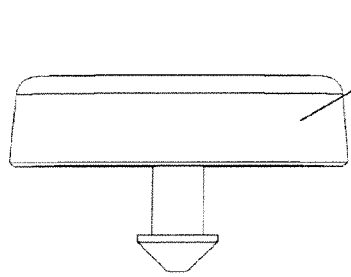
FIGS. 3E, 3F, 3G, and 3H show attachment of another embodiment of the RFID tag to the golf club.
Figure 3F:
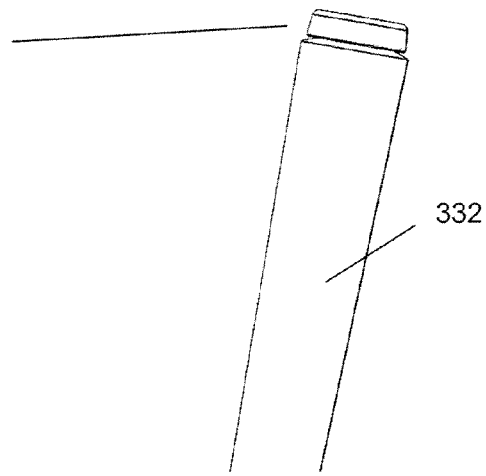
Figure 3G:
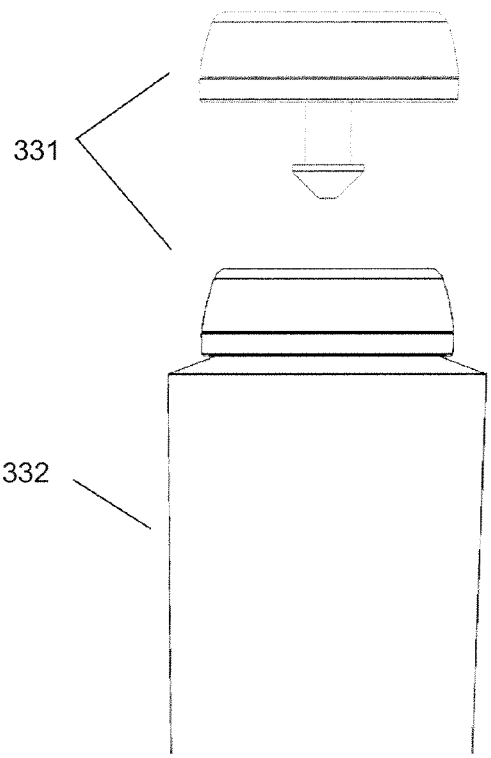
Figure 3H:
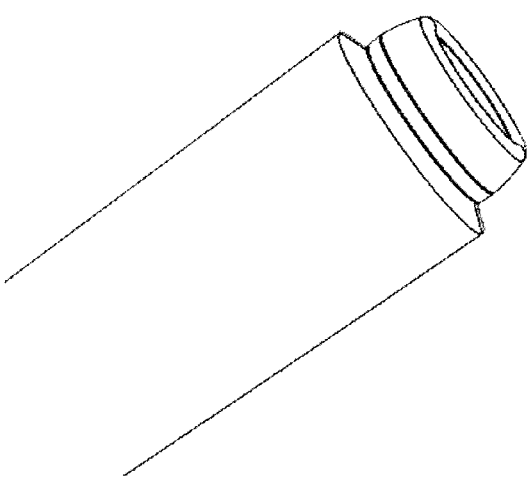
Figure 4A:
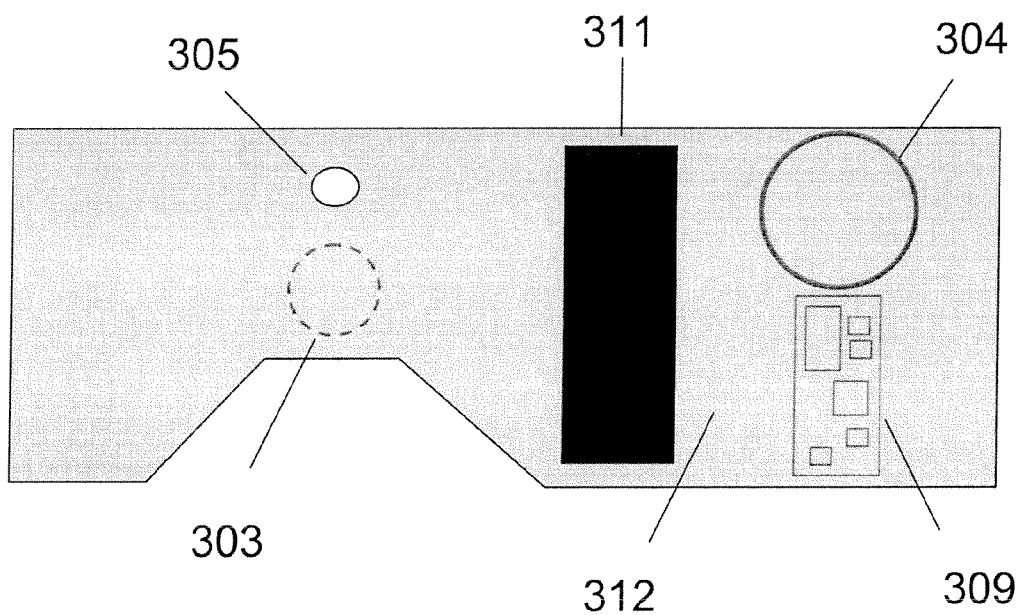
FIG. 4A shows one embodiment of the RFID tag in flat orientation before attachment to the golf club.
Figure 4B:
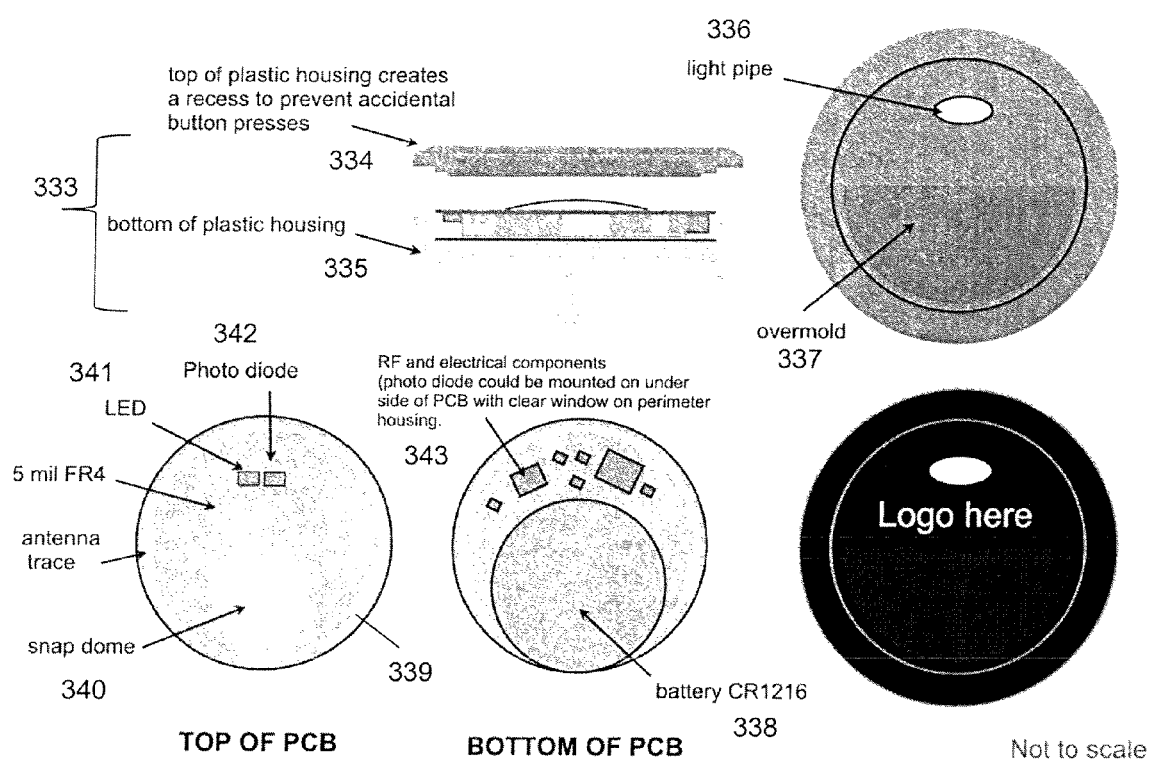
FIG. 4B shows details of another embodiment of the RFID tag before attachment to the golf club.

Alternatively, the RFID tag could be incorporated into the grip of the golf club or into the shaft of the golf club during manufacture of the golf club. One exemplary embodiment of an aspect of the invention is shown in FIGS. 3E, 3F, 3G, and 3H. A RFID tag 331 is attached to a golf club grip 332 at the butt-end of the grip. The RFID tag is a circular disc with a post on the underside as shown in FIGS. 3E and 3G. The approximate size of the disc is 0.8 inches diameter and 0.2 inches tall, with the post being approximately 0.4 inches long and 0.1 inches diameter. The post on the tag inserts into the vent hole at the butt-end of the golf club grip as shown in FIGS. 3F and 3H. In FIG. 4B, the RFID tag is shown in cross section view as well as top and bottom views of the printed circuit board and two top views of the housing. The tag housing includes a top portion 334 and a bottom portion 335. The housing can be made of plastic or other durable material to protect the electronics and to keep the tag from breaking when the tag hits the ground or the bottom of the golf bag. The top portion of the housing 334 has material higher around the perimeter of the top of the housing 334 in order to create a recess for the button used to record a golf stroke. The recessing of the button is important to eliminate accidental button presses and to prevent the button from being inadvertently pressed when the golfer replaces the golf club into the golf bag. A clear portion 336 is provided in the housing to allow light and darkness to be sensed by the photo cell 342 and to allow the LED 341 to be visible to the golfer. The housing is constructed is such a way to be water resistant or water proof to protect the electronics. The tag is covered with resilient material, such as overmolding or plastic, that provides flexibility and protection from dust, water, and mechanical shock.

As shown in FIG. 4B, the RFID tag is made up of a power source, such as a battery 338, LED 341, switch 340, solar panel or photo detector 342, and electronics 343 that include a RF transmitter, microprocessor, and antenna. The electronics are housed in a small enclosure as part of the tag that is positioned on the butt-end of the golf grip as shown in FIG. 3F, so that it is not obtrusive to the golfer and has minimal or no impact on the balance of the club. On the top of the tag is an optional LED and a thin membrane switch accessible to the golfer as shown in FIG. 3E.

The RFID tag is normally in the "off" position. When setting up for the golf stroke, the golfer presses the switch 340, which activates the electronics 343 in the tag. Upon activation, the tag transmits information to the handheld. This data communication is shown in FIGS. 5A and 5B. This communicated information includes club type and a command to mark the current location by GPS and a command to register a stroke. Optionally, there may be an audio response from the handheld confirming receipt of tag information.

An additional embodiment of the tag would not use the LED to remind the golfer to push the button indicating that a stroke is occurring. Instead, the LED is used to indicate to the golfer that the button has been pushed successfully, indicating that a stroke is occurring. After the golfer pushes the button, and after a short delay the LED blinks once. The delay is to allow the golfer to remove his finger from the button and to see the LED.

There are several embodiments of powering the RFID tag. One embodiment is a primary battery that provides power to the RFID tag, and the tag is disposed at the end of battery life. Another embodiment includes a compartment to access the battery on the RFID tag to allow for replacing the battery when it is depleted. This battery could be a primary battery or rechargeable battery that is removed for recharging, then reinstalled. Another embodiment is a rechargeable battery and a mechanism included in the tag electronics for recharging the battery in place on the tag, such as a direct connection to an AC charger or an inductive charging circuit.

Figure 16A:
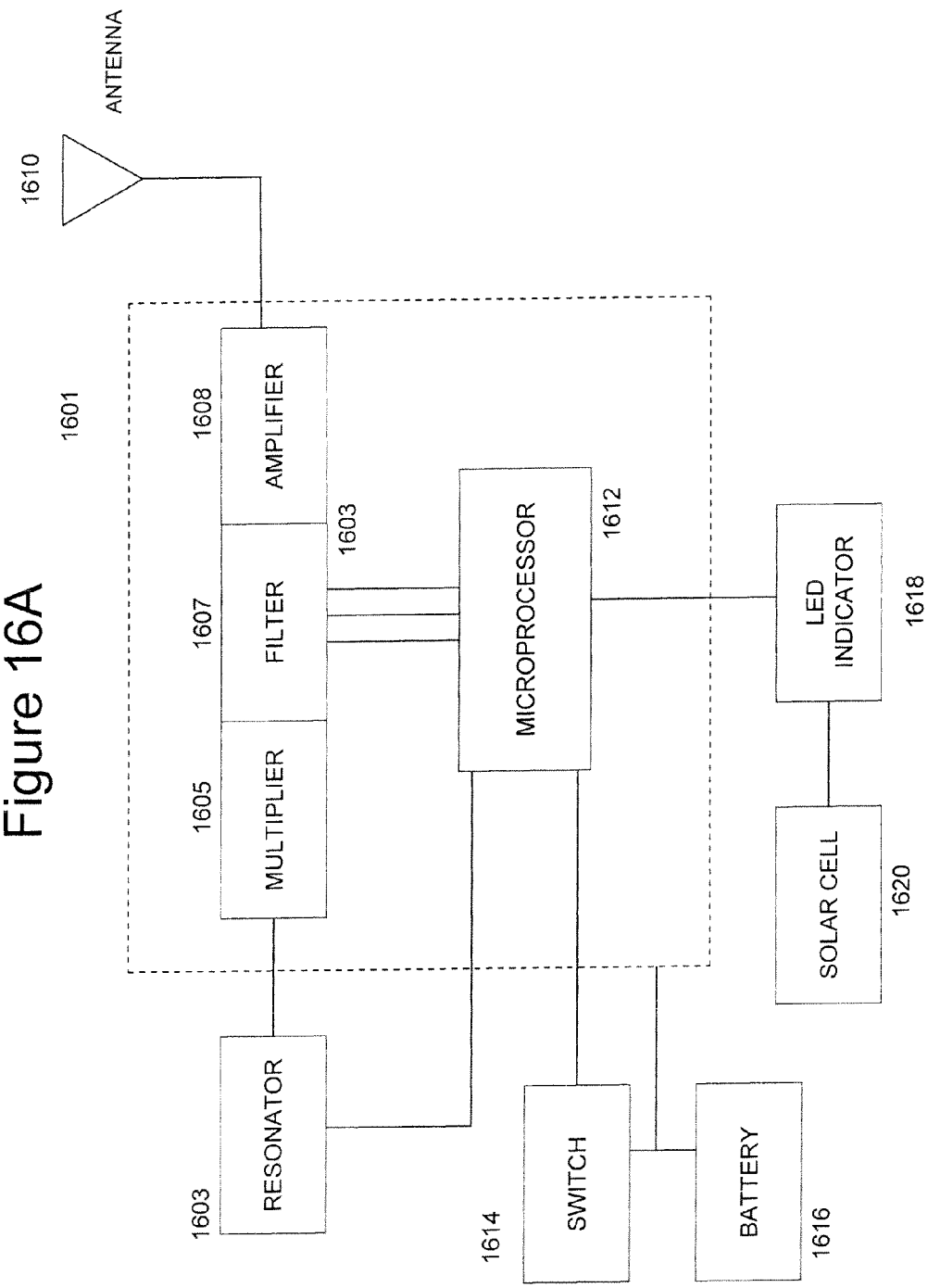
FIGS. 16A, 16B, 16C, and 16D are block diagrams showing different embodiments of the circuitry included in the golf club tag.
Figure 16B:
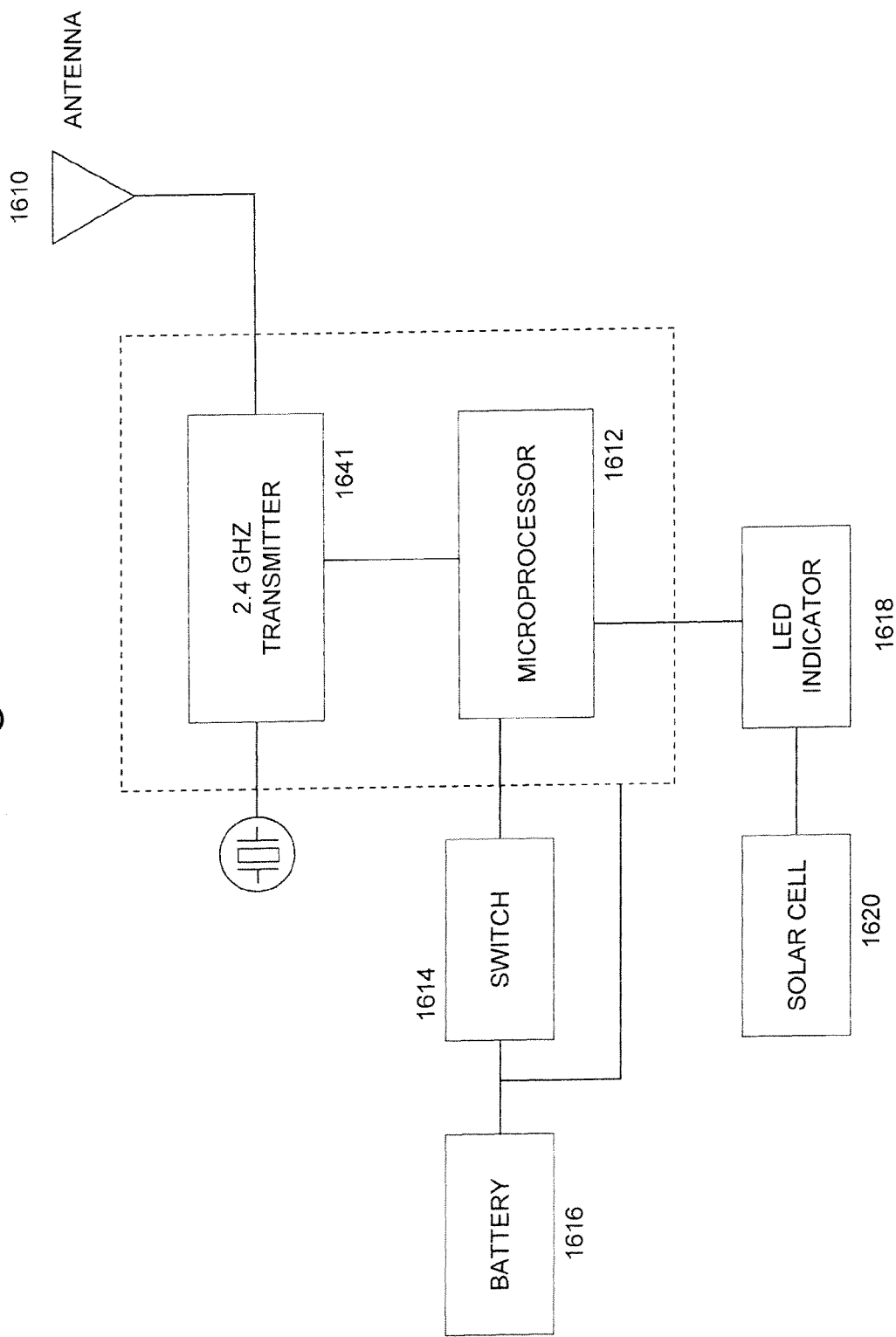

FIGS. 16A and 16B show circuitry for two embodiments of the RFID tag attached to the golf club. Items outlined in dashed lines indicate components that could be incorporated into a custom integrated circuit chip. FIG. 16A is a low-cost 2.4 GHz transmitter 1601 using discrete components. The signal source is a surface-acoustic wave resonator (SAW) 1603 at a frequency of 800-835 MHz. In this particular embodiment the SAW resonator 1603 is at a frequency of 809 MHz. Using discrete transistors, such as NEC NE68019 or NE68519, the 809 MHz signal is multiplied by three 1605, resulting in a frequency of 2427 MHz. This signal is filtered 1607 to reduce the fundamental frequency at 809 MHz and its harmonic at 1619 MHz. Using similar discrete transistors, the filtered signal (at 2427 MHz) is then amplified 1608, optionally filtered, and transmitted through the 2.4 GHz transmit antenna 1610. In a particular embodiment the final amplification stage could be an injection-locked amplifier. A particular embodiment of the transmit antenna is a 2.4 GHz folded dipole antenna that is printed on the printed circuit board containing the tag electronics. Alternate embodiments of the antenna include a 2.4 GHz yagi antenna printed on the tag printed circuit board and miniature patch antenna. FIG. 16B shows an alternate embodiment of the 2.4 GHz transmitter, using available integrated circuit RF transceiver or transmitter 1641, such as the TI-Chipcon CC2500 transceiver. Another embodiment of FIG. 16B is a 2.4 GHz transmitter with microprocessor on the same chip, such as TI-Chipcon CC2510 transceiver with microprocessor.

Figure 16C:
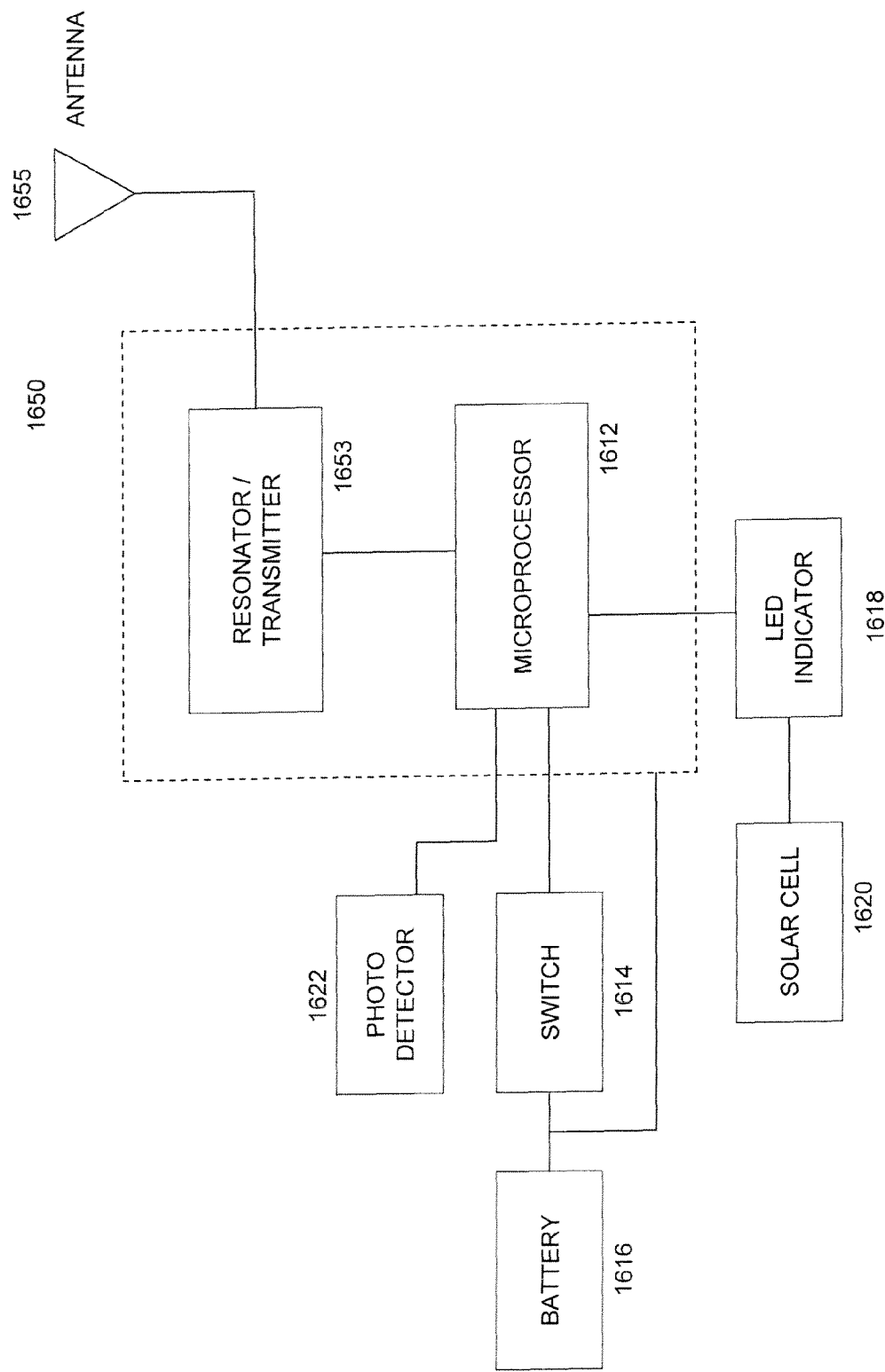
Figure 16D:
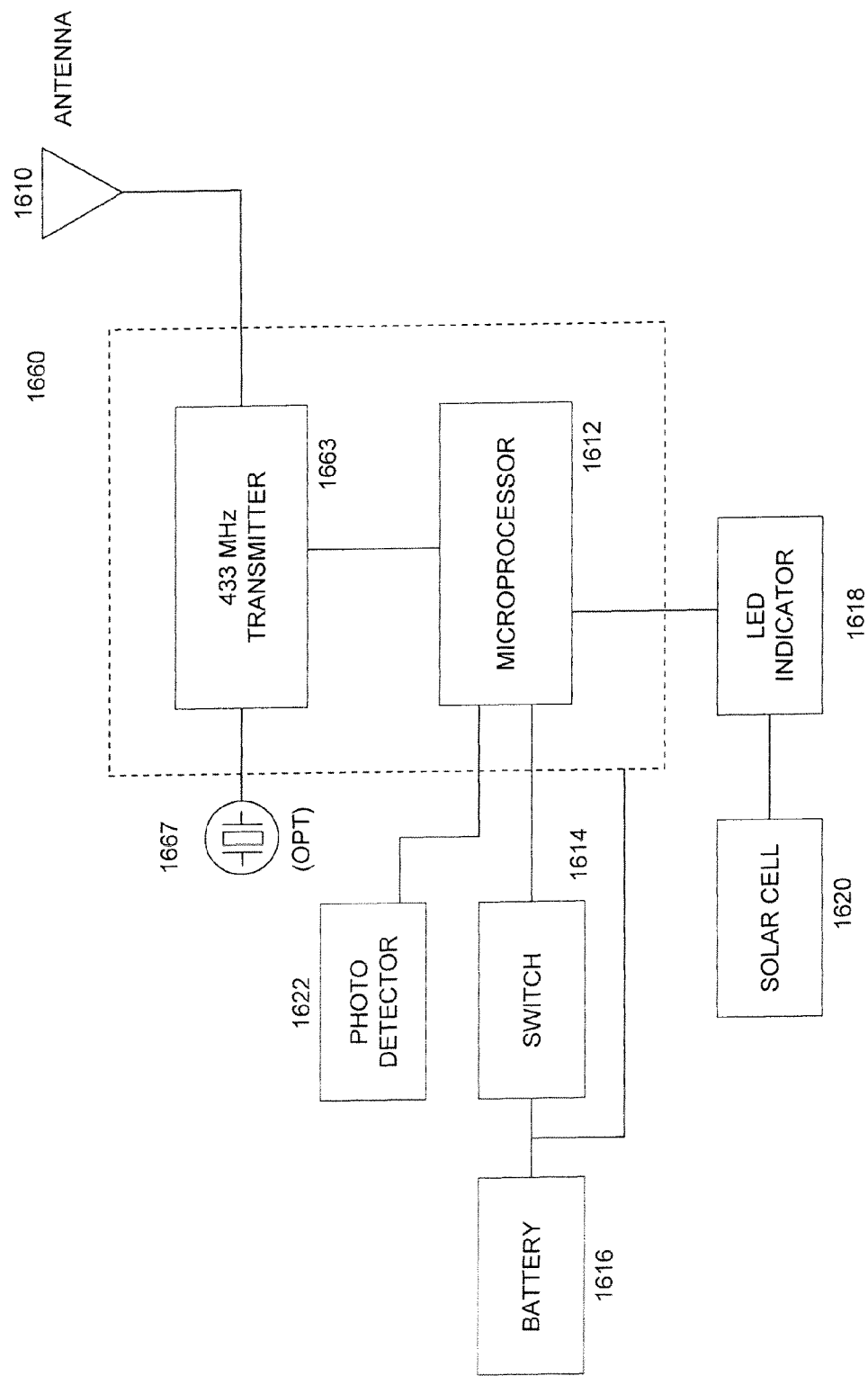

Another embodiment of the circuitry of the RFID tag attached to the golf club is to transmit at 433 MHz. FIG. 16C is a low-cost 433 MHz transmitter 1650 using discrete components. The signal source is a 433 MHz surface-acoustic resonator (SAW) 1653. The 433 MHz signal is amplified by discrete transistors, such as NEC NE68019 or NE68519, optionally filtered, and transmitted through a 433 MHz antenna 1655, such as a loop antenna printed on the printed circuit board. The corresponding receiver would operate at 433 MHz. Other frequencies, such as 315 MHz, are practical for use in this system. FIG. 16D shows an alternate embodiment of the 433 MHz transmitter 1660, using available integrated circuit RF transceiver or transmitter 1663, such as the RF Microdevices TR3000 or TX5000, or Analog Devices ADF7011 with an optional crystal 1667.

The RFID tag circuitry includes a microprocessor 1612 that performs several functions. The microprocessor controls the timing of the transmit signal, creating a transmit pulse of a duty cycle. In a particular embodiment the transmit pulse is 5 milliseconds in duration, every 200 milliseconds. The pulse is repeated a number of times, for example 2 times, in order for the receiver in the handheld to receive the transmitted information, then the transmitter returns to non-transmit mode. The microprocessor also controls power management, providing power to the various components in the circuit only as required to save power and prolong battery life. The microprocessor also provides the pseudo-unique serial number of the RFID tag, which is associated with a particular golf club. The tag circuitry shown in FIGS. 16A, 16B, 16C and 16D may optionally also include an additional switch for a cancel button or the same switch may be used as described below to provide the ability to cancel the recording of the stroke.

Other elements of the RFID tag circuit as shown in FIGS. 16A, 16B, 16C, and 16D include the switch 1614 that the golfer activates to turn on the RFID tag electronics, with the command to the handheld to record the location, record the club used, and record the golf stroke. A power source, such as a battery 1616, provides power to the RFID tag. The tag circuit optionally includes a solar cell 1620 that powers the LED indicator 1618 (or other display device such as an LCD device) when exposed to light. This LED indicator acts as a reminder to the golfer to activate the tag so that the golf data is recorded.

Figure 17A:
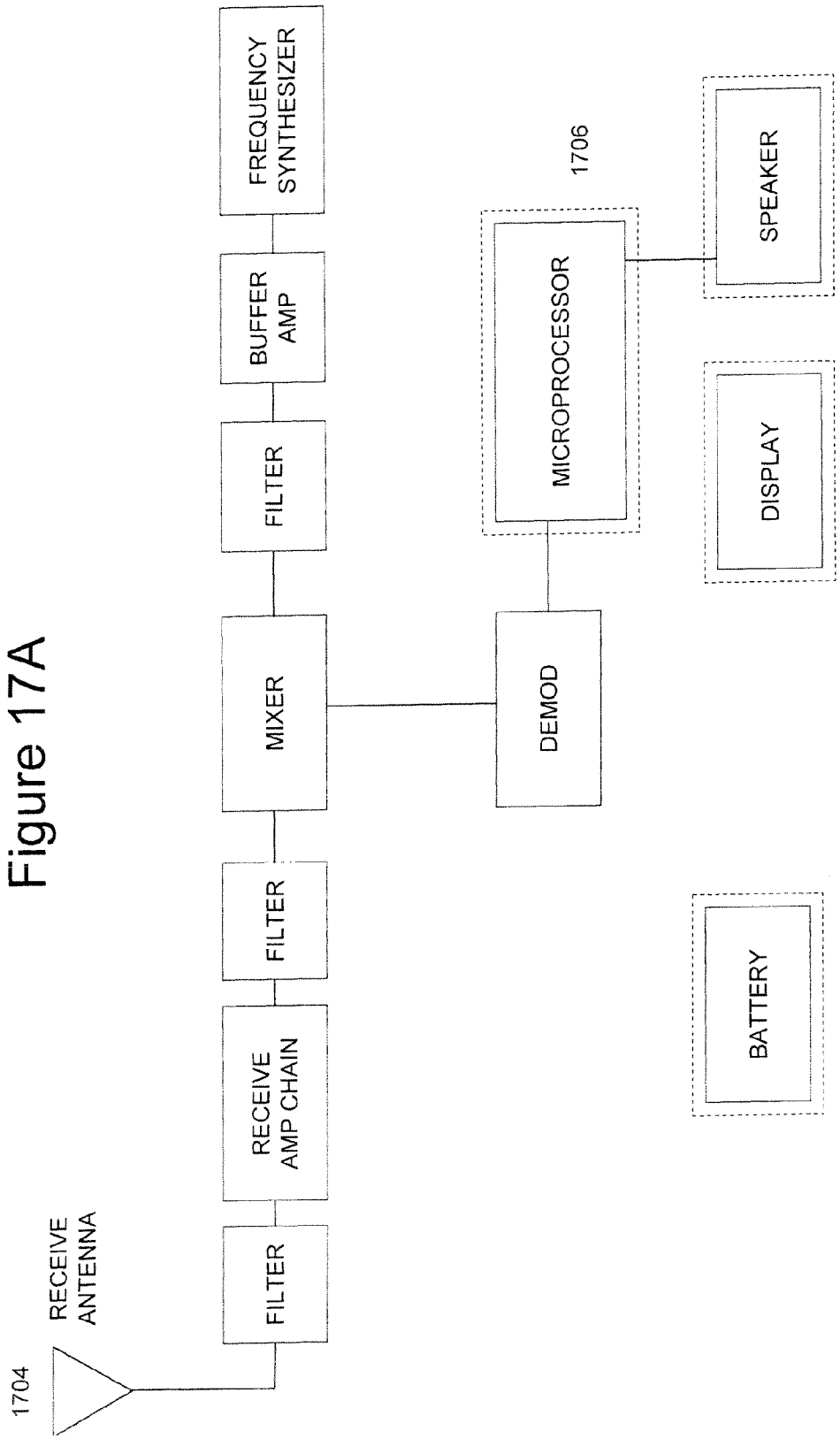
FIGS. 17A and 17B are a block diagrams showing two embodiments of the RF receiver circuitry included in the handheld device.
Figure 17B:
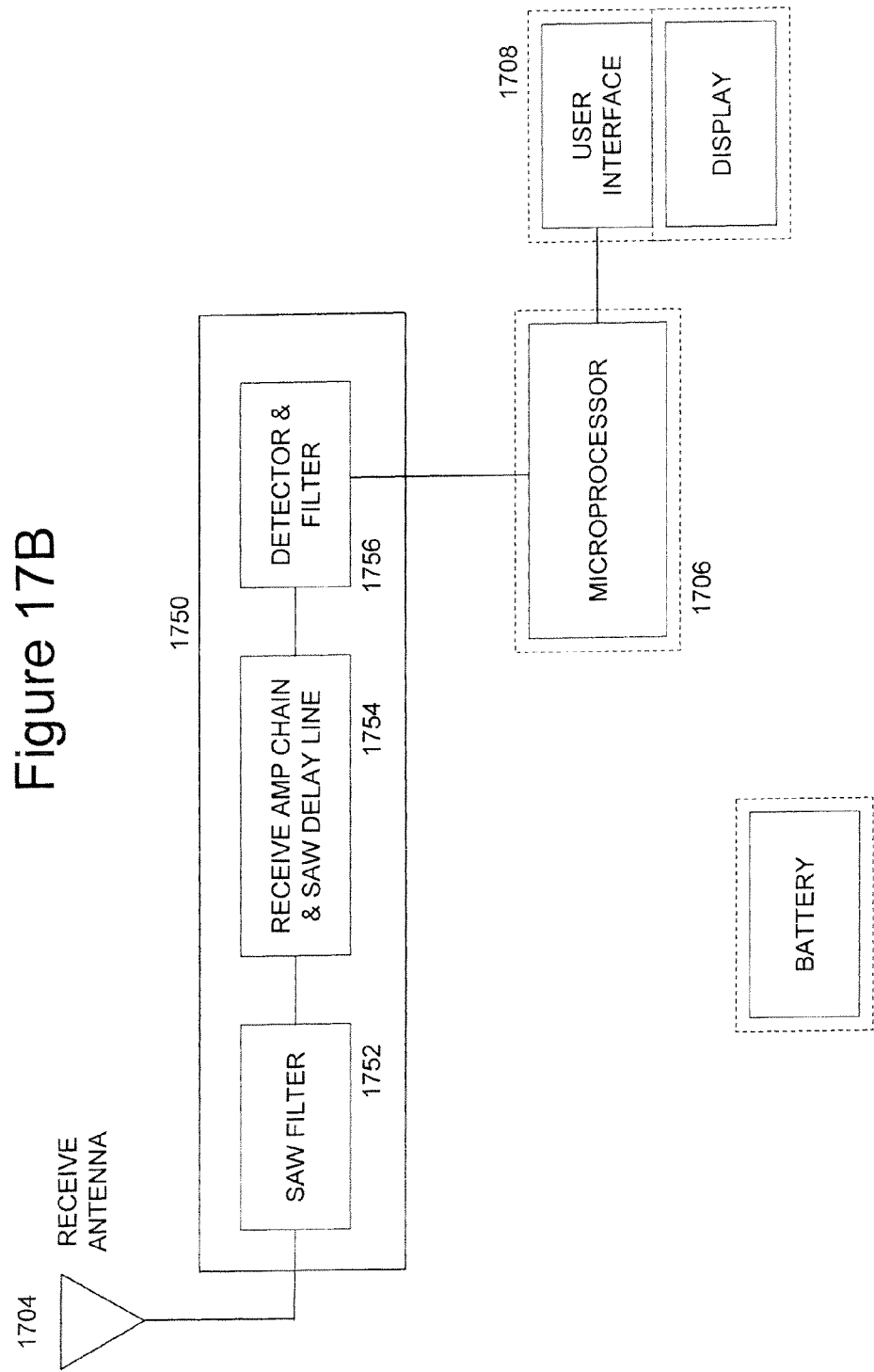

FIGS. 17A and 17B show circuitry for two embodiments of the RFID receiver or transceiver incorporated into the handheld device. The components of a separate GPS receiver are not shown in this figure but they are present in at least certain embodiments. Items outlined in dashed lines indicate components that could be shared between the RFID receiver or transceiver and GPS device; it will be appreciated that portions of the GPS receiver and the RFID receiver may be common and shared in certain embodiments. In one embodiment, the RFID receiver circuit includes a 2.4 GHz receive antenna that receives the 2.4 GHz signal from the RFID tag on the golf club. In another embodiment, the RFID receiver circuit includes a 433 MHz receive antenna that receives the 433 MHz signal from the RFID tag on the golf club. As shown in FIG. 17A, the received signal is filtered, amplified, and demodulated to extract the identification code from the RFID tag. FIG. 17B shows an alternate embodiment in which the receiver functions are incorporated into a single integrated circuit 1750, such as the RF Microdevices RX5000. This signal is filtered 1752, amplified 1754, and demodulated 1756 to extract the identification code from the RFID tag. In both FIGS. 17A and 17B, the microprocessor 1706 decodes the receiver signal to extract the quasi-unique identifier of the club and the status information. In all embodiments, the microprocessor controls timing of the receiver circuitry, keeping the circuit in a low-power listen mode while there are no signals to receive. When the receiver recognizes that there is a signal to receive, the microprocessor turns the receiver on to capture the transmitted signal. The transmitted signal is repeated several times so that the receiver can turn on from listen mode to on mode and receive all the information in the transmitted signal. The microprocessor also controls other components in the receive chain, turning on devices only as required in order to conserve power and prolong battery life. The microprocessor stores information about the golf round in a storage device, such as a flash memory which is a form of non-volatile memory. When the tag transmits its information, it indicates to the microprocessor to access the GPS receiver and mark the location, register which club is used from the identification information from the RFID tag, and to register a golf stroke. The microprocessor also controls the user interface, for example the display and buttons or switches. The display may be provided as a user interface to indicate information received from the RFID tag on the golf club. For example, the display may show the club being used, the current location and distance of the last golf stroke. Optionally, a speaker may be provided as a user interface to offer feedback about information received from the RFID tag on the golf club. For example, the speaker may respond with a single beep every time the RFID tag is activated by pressing the switch on the tag. This would indicate to the golfer that the handheld received the command from the RFID tag to mark the location, register the club used, and register the golf stroke. Optionally, the speaker may respond to other commands, such as cancel the stroke or add a penalty stroke, with different audio responses.

The RFID tag electronics are on for a defined period of time to transfer data to the RF receiver in the handheld. After the data transfer, the transmitter on the RFID tag is powered off. The microprocessor goes into a low-power mode so that the timer for the off-cycle of the LED is active. After the LED timer runs down, the RFID tag electronics are returned to the full Off condition.

As shown in FIGS. 3B and 3D, a photo-sensor or solar panel 311 and LED 305 are included on the RFID tag 301 in one embodiment. The LED 305 is adjacent to the switch 303 or may be incorporated into the switch. When the golf club is removed from the bag and exposed to ambient light, the LED turns on, continuous or blinking. When the golfer presses the switch 303, the LED 305 turns off. This method reminds the golfer to activate the tag before taking a stroke.

Similarly, as shown in FIG. 4B, a photo-sensor or solar panel 342 and LED 341 are included on the RFID tag in another embodiment. The LED 341 is adjacent to the switch 340 or may be incorporated into the switch. When the golf club is removed from the bag and exposed to ambient light, the LED turns on, continuous or blinking. When the golfer presses the switch 340, the LED 341 turns off This method reminds the golfer to activate the tag before taking a stroke.

The LED optionally provides a reminder to the golfer to activate the switch on the tag. The LED turns on or blinks until the golfer activates the switch or until the solar panel is returned to darkness, i.e. when the club is returned to the golf club bag. When the golfer activates the switch, indicating a stroke, the RFID tag electronics turn on. The LED is turned off for a period of time, e.g. 1 minute after activating the switch. This would allow the golfer to take his/her stroke without being distracted by the LED. It also allows the golfer to be reminded with the LED for a stroke immediately following another stroke, such as putts. A golfer may push the switch without the LED reminder. In this case the switch would give the same command: register a stroke, note which club is being used and mark the location.

Alternatively the step of activating the electronics can occur after taking the stroke or at any time while the golfer is close to the location to be recorded.

Optionally, a golfer may wish to deactivate the LED reminder, for example to play a round that is not recorded. The LED may be disabled with a specific series of pressing the switch. For example, the switch may be pushed one short, for example one second, then one long, for example longer than 5 seconds. This command would deactivate the solar panel and control of the LED for a period of time, for example 6 hours. Alternatively, an additional switch could be included on the RFID tag to deactivate the LED. Alternatively, a movable cover may be provided to prevent the solar cell from activation.

Optional embodiments of the RFID tag include:
  A "cancel shot" function on the tag would allow the golfer to cancel the last activation of the RFID tag and resultant recording of the handheld receiver. This could be used if the golfer decides to change clubs, for example.
  A "penalty shot" function on the tag would allow the golfer to add penalty shots in the case of a lost ball or a provisional shot. The "penalty shot" function might not include location.

These additional functions could be incorporated into an additional switch or a recognized pattern of pressing the single switch. Logic, such as microprocessor 1612, may decode user activations of a single switch. For example, the "cancel shot" could be accomplished by pressing the switch and holding for a period of time, e.g. 3 seconds; and the "penalty shot" could be accomplished by pressing the switch quickly two times. Each of these switch sequences may occur after a single press of the switch that turns on the tag electronics. Receipt of these commands could by acknowledged by a visual display or audio tone emitted from the handheld. In one embodiment of the invention, the RF communication between the RFID tag and the handheld is in the 2.4 GHz frequency band, with a maximum transmit power of 0.5 watt. This provides nearly worldwide wireless compliance. In a particular embodiment, the RFID tag contains a 2.4 GHz transmitter only, and the handheld contains a 2.4 GHz receiver only. Alternatively, the RF communication could occur in the 900 MHz frequency band to use existing RFID technology, such as Alien Technology RFID tags. In another embodiment of this invention, the RF communication between the RFID tag and the handheld is in the 433 MHz frequency band, which provides nearly worldwide wireless compliance. In a particular embodiment, the RFID tag contains a 433 MHz transmitter only and the handheld contains a 433 MHz receiver only. In other embodiments the RFID tag could contain a 433 MHz transceiver and the handheld could contain a 433 MHz transceiver.

Golf course information, such as maps and detailed topography of the golf course, is downloaded from a server to the handheld device. This can be accomplished with an interface to a computer, either by direct connection or by a wireless interface, such as Bluetooth. Alternatively, the handheld may include a wireless interface connected directly to the internet.

The handheld may contain existing golf GPS technology. The present invention incorporates additional functionality in the handheld, which includes a RF receiver, antenna, microprocessor, and power source. The RFID receiver may share some of the circuit elements of the GPS function in the handheld, such as the battery, display, and microprocessor or even further circuit elements. The RF antenna is printed on the existing pc board. The RF receiver listens in a low-power mode for a transmitted signal from the RFID tag on the club. When the receiver recognizes a transmitted signal, it turns on continuously for a period of time to capture the entire amount of information from the RFID tag, then returns to low-power listen mode, which would conserve battery power. The RFID tag would transmit the information several times serially to allow enough time for the receiver to receive the information, then the tag would go into a low-power mode and stop transmitting. Each time the switch is activated by the golfer, the RFID tag turns on and transmits club type and a command to mark the location and register a stroke.

Upon receipt of the command to "mark-the-spot", the handheld records the location of the GPS receiver (located in the handheld). Ideally, the handheld is worn on the golfer, so the ball location is accurately recorded. Alternatively, the handheld might attach to the golf bag, resulting in a small error in recording the actual location of the ball, the difference between the location of the golf bag (handheld) and the ball.

After each hole the handheld provides the shot information and score to be confirmed so that the golfer can adjust the score as necessary. In one embodiment of the present invention, the display lists each stroke with type of club and distance. The golfer confirms the number of strokes or adjusts the number of strokes as necessary. Optionally, the display shows each shot with distance to the last recorded location. Information about distances on the golf course would be provided to the golfer. Current technology provided in GPS golf systems includes distance information from the current location to various points on the golf course, such as the hole or hazards.

Shielding techniques, known in the art, are required to achieve optimum performance of the handheld device. The device contains two or more signal sources operating at different frequencies, for example the clocks or crystals supplying timing for the microprocessors and frequency synthesizers. Furthermore, these signal sources generate additional radio-frequency signals used in the receivers, such as the GPS receiver and the RF receiver. Standard techniques are used to minimize the cross-talk between the various high frequency signals, such as extensive internal ground and power planes in the printed circuit board, filtering with discrete components, such as capacitors and inductors, and metal shields soldered over sensitive circuit elements. Further isolation between circuit elements can be achieved by inserting separate receivers in separate shielded housings or separate compartments of a housing and the use of ferrite beads on cables that enter and exit the housings. The internal dimensions of the housings are less than one-half the wavelength of the highest operating frequency to avoid resonant modes that may couple one or more unwanted frequencies to the frequency of operation.

Additionally, methods of operation can minimize crosstalk, such as timing the operation of the various receivers so that a particular receiver is not on while another receiver is operating. For example, the RF receiver operating at 2.4 GHz listens for a short period of time, for example 5 milliseconds, and is off for a longer period of time, for example 100 milliseconds. The GPS receive is activated during those periods when the RF receiver is off, for example during the 100 millisecond off period of the RF receiver. Similarly, other functions can be timed in the operation of the system to reduce cross-talk.

The present invention includes RFID tags to be applied to the golfer's clubs. One embodiment of this invention includes a set of 14 RFID tags configured to communicate only with its handheld device, with semi-random identification codes that make the tags unique to their particular handheld device. This would prevent the handheld from incorrectly receiving information from another golfer's club tag. The pack of 14 RFID club tags will include standard identification on each tag, such as "Driver" or "3-Wood" or "7-Iron". These identifiers would be printed on the RFID tag. Optionally the printed identification could be removed from the RFID tag after attachment to the club. The standard identification of the 14 RFID tags would appear as the club identifier in the handheld device. Optionally, the golfer may change the name of the club identifier. For example, if the golfer wishes to label a club "3-Hybrid", he/she may change the standard identifier for "3-Iron" to "3-Hybrid". The golfer would list all registered clubs with their standard identifiers on the handheld display, highlight the identifier that requires change, and edit and save the new information. FIGS. 18A, 18B and 18C show flow charts outlining typical set-up and use of the system.

Optionally, additional RFID tags could be provided that require initialization from the handheld device. This initialization process would include using a command on the handheld to initialize additional club tags. The additional tag labeled "Club 1", for example, would be held in proximity to the handheld and powered on. The handheld would receive the information about the tag with the label "Club 1". It would then prompt the golfer to enter another name or accept the given name. In a particular embodiment, all RFID club tags could be provided in this manner, labeled "Club 1", "Club 2", etc., and the golfer would name all the clubs as desired when initializing the club tags.

The RFID tags are provided with an identification code. In one embodiment of this invention, the RFID tags are supplied with random codes, and the RFID tags are not associated with a particular handheld device. The golfer assigns a name to each club with an initialization process of the handheld device as follows. The device is put in an initialization mode by a command from the user, by pushing a button or selecting from a menu. The handheld indicates that it is ready to initialize a club, by an indication on the display. The golfer holds the RFID tag near the handheld and pushes the button on the RFID tag. The tag turns on and transmits its identification code. The handheld receives this identification code and prompts the golfer to assign a name to this RFID tag (club). The golfer inputs a name for the club by selecting choices on the display. In one embodiment, the handheld offers a list of standard club names from which the golfer can select the desired name. In another embodiment, the handheld offers an alpha-numeric display so that the golfer can spell out the word associated with that particular club.

In an alternative embodiment, the code is programmed to identify a particular club, such as "3-Iron", and is associated with a particular handheld. The system is packaged such that each RFID tag represents a different type of golf club. The RFID tags are initially manufactured with random codes, then renamed during a later manufacturing stage to include the name of the type of club. Alternatively, the RFID tag is programmed with an initial code that would include the name of the type of club. In both of these embodiments, the handheld is programmed to recognize the RFID tags supplied with the handheld device, so there is no initiation process by the golfer. Optionally the golfer may rename any club by performing the initiation process as described previously.

Marking the Location of Each Hole

At the end of a hole the golfer will be prompted to confirm the data collected on the hole. For example, if a golfer scores a "5" on a hole the device's display will show a "5" as the score. In a particular embodiment, the handheld would also display the recorded locations of all five shots. The golfer is presented with "confirm" and "edit" choices. If the golfer chooses to "edit" the score there could be several ways to edit the data. The golfer could potentially delete strokes by selecting the stroke number, then "delete".

If the golfer chooses to "confirm" the score the golfer would then be presented with the option to "mark the hole location" (i.e. "yes" or "no"). If yes, the golfer can capture the distance of the last shot (usually a putt) made. If the golfer selects yes the device would instruct the golfer to hold the handheld device over the hole and select a "mark the spot" command.

Physical Embodiments

Figure 6:
FIG. 6 shows a configuration of the apparatus where the GPS receiver and RFID transceiver are in the same housing and worn on the belt or in the front pocket while golfing.

Option 1—GPS & RFID Transceiver All in One Housing; See FIG. 6

The hardware and electronics required to communicate with the club tags are included in the GPS handheld device. The device is worn on the golfer's belt or kept in the golfer's front pocket. In a preferred embodiment the device also has broadband Internet connectivity—allowing for on-the-fly downloading of golf course maps and uploading of data collected after a round of golf.

Figure 7:
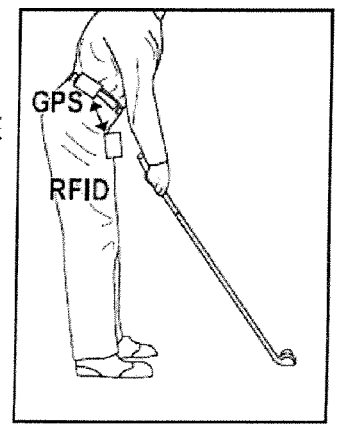
FIG. 7 shows a configuration of the apparatus where the GPS receiver and RFID transceiver are in separate housings and communicate with each other via wireless communication (e.g. Bluetooth). The housings can be worn on the belt or in the front pocket while golfing.

Option 2—RFID Transceiver in a Separate Housing (See Example Shown in FIG. 7)

This option may be easier to manufacture (e.g. less shielding requirements), but would require the golfer to wear two devices while golfing.

The hardware and electronics required to communicate with the club tags are included in a housing (separate from the GPS device housing). The RFID device is worn on the golfer's belt or kept in the golfer's front pocket and communicates with the GPS device—also worn on the belt or in the pocket—wirelessly (e.g. via Bluetooth or similar). In a preferred embodiment the GPS device also has broadband Internet connectivity—allowing for on-the-fly downloading of golf course maps and uploading of data collected after a round of golf.

Figure 8:
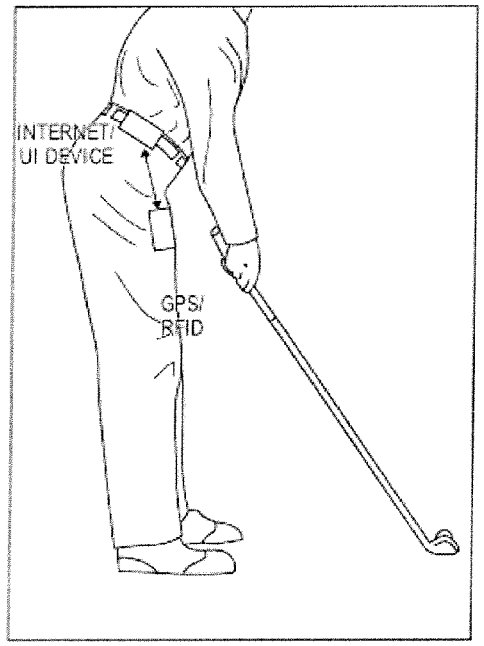
FIG. 8 shows a configuration of the apparatus where the GPS receiver and RFID transceiver are in one housing and communicate with an Internet device (e.g. cell phone) via wireless communication (e.g. Bluetooth). The housings can be worn on the belt or in the front pocket while golfing. The Internet device can be clipped to the golfer's golf bag or cart to minimize the size of what is worn.

Option 3—RFID Transceiver & GPS in One Housing and Wireless Internet and User Interface Device (e.g. Cell Phone) in a Separate Housing This option, an example of which is shown in FIG. 8, may be easier to manufacture (e.g. less shielding requirements). This embodiment will allow the golfer the flexibility of wearing the Internet device (e.g. cell phone) while golfing or not. If the golfer prefers to not wear the cell phone during play, the data could be recorded by the GPS/RFID device and automatically sent to the cell phone when in close proximity via wireless communication (e.g. Bluetooth). For example, the golfer could keep the cell phone in the golf cart. When the golfer returns to the cart after each shot the data would be sent to the cell phone via Bluetooth.

The GPS receiver and the hardware and electronics required to communicate with the club tags are included in a housing (separate from the cell phone housing). The GPS/RFID device is worn on the golfer's belt or kept in the golfer's front pocket and communicates with the cell phone wirelessly (e.g. via Bluetooth or similar).

Figure 9:
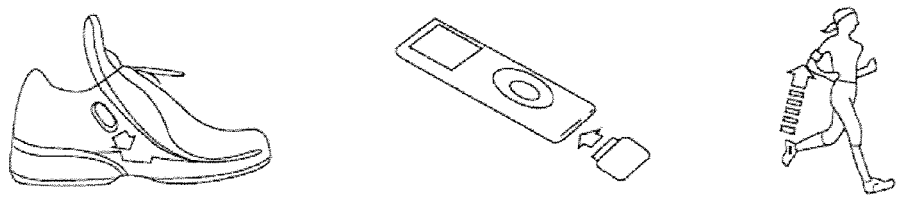
FIG. 9 shows an example of an existing apparatus designed to fit inside a shoe and communicate wirelessly to another apparatus worn on the body during a sporting activity. The apparatus for the present invention (i.e. the RFID transceiver and/or GPS receiver) can be designed to fit inside a golf shoe in a similar manner.
Figure 10:
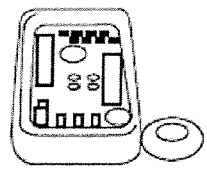
FIG. 10 shows the size of an existing GPS receiver designed to fit inside a shoe.
Figure 11:
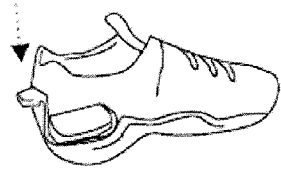
FIG. 11 shows an existing design for a GPS receiver built into a running shoe.

An alternative embodiment is to provide the GPS/RFID device as a module to be incorporated into the shoe, as shown in FIGS. 9, 10, and 11. See also examples of Nike+iPod running shoes with electronics inserts and GTXC GPS enabled shoes (FIG. 9). This device could be worn on the shoe or potentially built-in to clothing or equipment, for example manufactured into golf shoes or a hat. An embodiment of this option allows the golfer to not wear the Internet device during play.

Alternate Golf Course Mapping Technique

Figure 12:
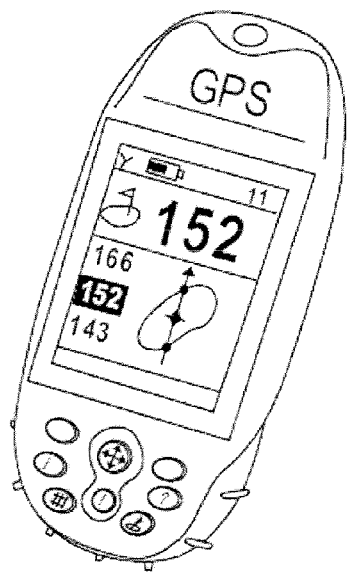
FIG. 12 shows an existing handheld GPS device used by people to map golf courses.
Figure 13:
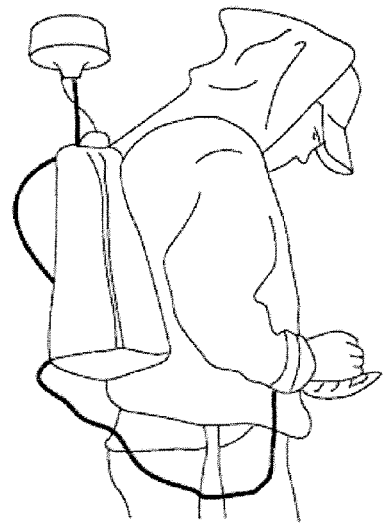
FIG. 13 shows a back pack mounted GPS receiver used by people to map golf courses.

Existing GPS companies (i.e. Golflogix and SkyCaddie) use people to map golf courses. The person mapping the course wears a backpack GPS receiver or one of the handheld products themselves (e.g. the SkyCaddie). See FIGS. 12 and 13.

This method is effective but the accuracy depends on the quality of job being performed by the mapper. For example, individual golfers can map their own courses and upload the data to sites such as SkyGolf.com. However, it is difficult for SkyGolf to know how accurate the data is. Therefore SkyGolf employs workers and trains them how to accurately map the courses. This is a very time-consuming and expensive endeavor as there are many points of interest to map on the golf course.

A more efficient method of mapping golf courses is described herein. Using overhead photography or satellite imagery (e.g. Google Maps) one could use a computer and a minimal amount of mapped points on a golf course to provide complete golf course map data.

Figure 14:
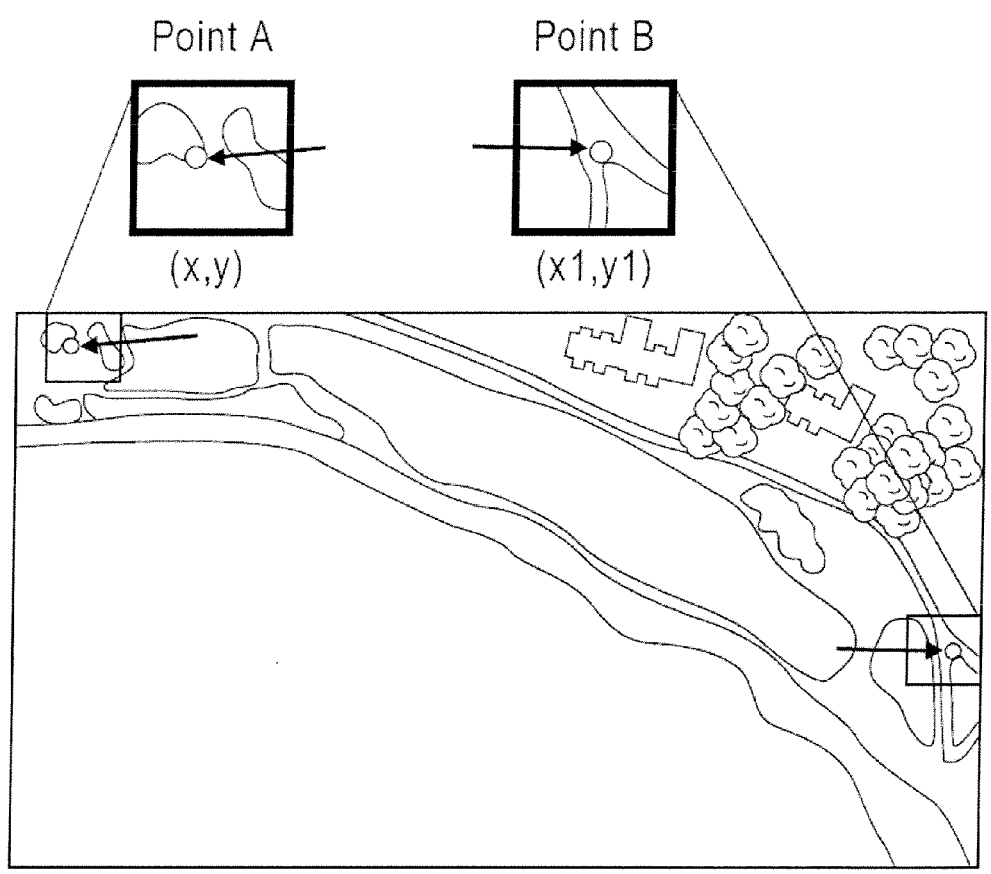
FIG. 14 shows two points on a golf course hole. These two points can be identified on a satellite image of the golf course hole and on the golf course hole itself. A person could confirm the X, Y, Z coordinates of the two points with a GPS receiver and adjust a satellite image's coordinates to match.
Figure 15:
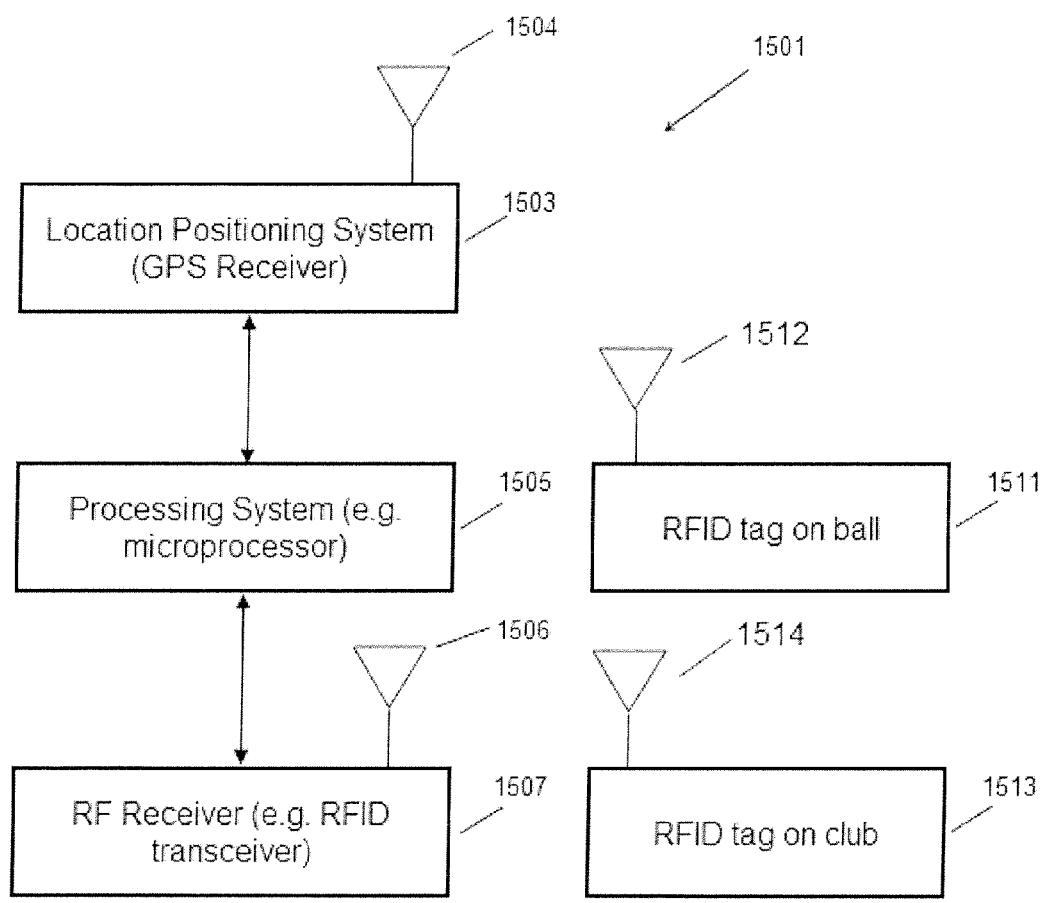
FIG. 15 shows an example of a location positioning system and an RF receiver system which can semi-automatically cause the collection of data about a golf stroke.

Satellite images of golf courses are relatively accurate but not exact. Satellite imagery (e.g. Google Earth) can contain X, Y & Z coordinates. The two dimensional photographs are layered with earth contours to create accurate three dimensional depictions of the earth. See FIG. 14.

If one was to take data from Google Earth for example and physically record a small number of positions at a golf course (i.e. 5-20 positions) the Google Earth map could be mathematically manipulated so that the 5-10 points taken at the course match exactly with the Google Map data. From there, the balance of the points of interest could be determined virtually—on the computer. This would save huge amounts of time and expense in physically mapping all points of interest on golf courses.

Alternatively the satellite images could be adjusted for accuracy by aligning easily identifiable satellite image features with known coordinates from a GPS mapped golf course, for example as created by SkyGolf.

Figure 19:
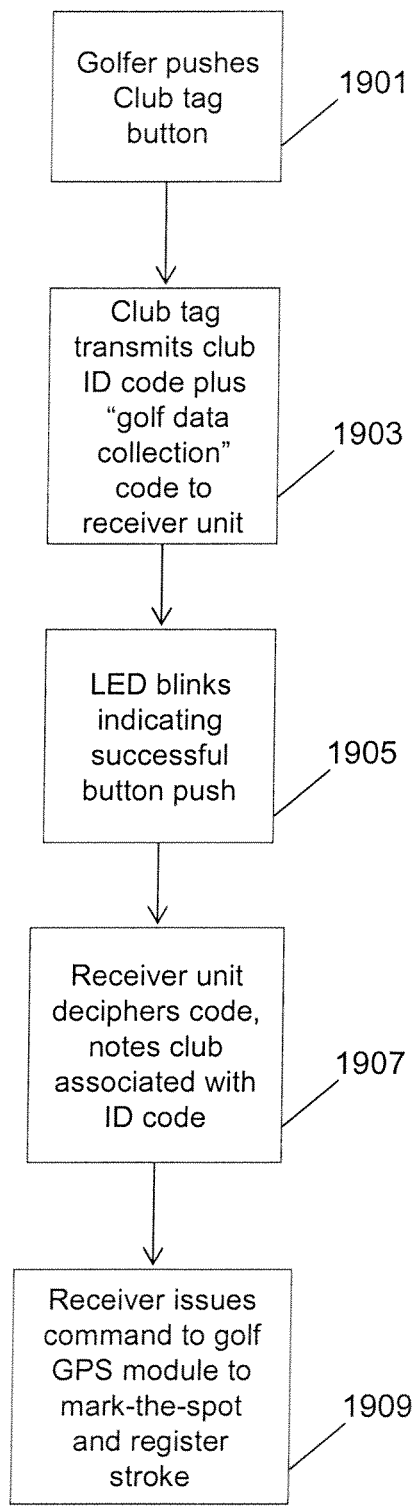
FIG. 19 is a flow chart showing operation in the golf data collection system.

FIG. 19 shows an example of a method for operating a system which includes club tags to semi-automatically collect data about a playing of golf. In operation 1901, the golfer pushes a button on a club tag (e.g. a club tag shown in FIGS. 1A-1D) on the club the golfer is using to take a stroke in a current round of golf. The club tag receives the push and causes, in operation 1903, the club tag to transmit to a receiver unit a club ID code and a code ("golf data collection" code) indicating that golf data (e.g. location of stroke and the fact that a stroke is being taken with the club having the transmitted club ID code) is to be collected. In operation 1905 the club tag optionally, in response to receiving the button push, causes an LED or other indicator on the club tag to blink or otherwise indicate that the button push was successful. In operation 1907, the receiver unit (e.g. the receiver unit shown in FIG. 6) receives the club ID code and, if necessary, deciphers it, and also receives the golf data collection code which is sent with the club ID code. In response to the golf data collection code, the receiver issues a command to a GPS module (or other positioning system) to mark the spot (e.g. determine and record the location of the stroke) and to record the fact that a stroke is being taken with the club at the recorded location. In certain embodiments, the system may not require a golf data collection code to indicate that golf data is to be collected, and so that code is optional in those certain embodiments.

While the foregoing description assumes that the club tag will have an active RFID system which is powered by its own power supply, it will be appreciated that, in alternative embodiments of the invention, the club tag may use a passive, beam powered RFID system in which the RFID tag in the club tag receives power from illumination (transmission of RFID signals) from an RFID reader. The RFID reader may periodically transmit RF interrogation signals to the passive, beam powered RFID device in the club tag, and this transmission provides power (as is known in the art) to the club tag and allows the club tag to determine the state of the switch in the club tag. In certain embodiments the switch may be mechanically "sticky" and hold its mechanically closed state for a small period of time (e.g. 2-5 seconds) or may electrically hold its state for a such period of time so that the RFID reader can interrogate the club tag at spaced intervals of time and still capture the state of the switch if it was pressed. The RFID reader will receive, in response to its interrogation signal, the club ID code, and optionally the golf data collection code, if the switch has been closed (e.g. the golfer pressed the button).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for collecting golf data, the apparatus comprising:
    a substrate to attach the apparatus to a golf club;
    a transmitter coupled to the substrate;
    a memory coupled to the transmitter, wherein the memory and the transmitter form an RFID that is disposed on the golf club when the substrate is attached to the golf club; and
    a switch coupled to the transmitter, the switch, when activated manually in a first manner by a user before or after a stroke, causing the transmitter to transmit, directly in response to the manual activation of the switch by the user before or after the stroke:
        an identifier of the golf club, the identifier stored in the memory, and
        a command to a golf data collection system, the command causing the golf data collection system to register the stroke, directly in response to the manual activation of the switch by the user before or after the stroke, by recording information indicating that the stroke was taken using the golf club identified by the identifier, wherein recording the information includes storing the club identifier and a location on a golf course for the stroke taken, and wherein the golf data collection system registers the stroke, in response to the manual activation, regardless of whether the stroke was actually taken,
    wherein the switch is disposed on the golf club when the apparatus is attached to the golf club, and
    wherein the switch is further configured to cancel the recording of the stroke when the switch is activated manually in a second manner.

2. The apparatus as in claim 1, further comprising a display device coupled to the substrate, the display device configured to remind the user to manually activate the switch before or after the stroke to cause the golf data collection system to register the stroke.

3. The apparatus as in claim 2, further comprising:
    a solar energy source coupled to the display device to provide power to the display device; and
    a battery coupled to the transmitter to provide power to the transmitter, wherein the transmitter includes an RFID transmitter.

4. The apparatus as in claim 3, further comprising:
    logic coupled to the switch and to the transmitter, the logic configured to determine whether a user activation of the switch indicates that the stroke is to be cancelled or recorded.

5. The apparatus as in claim 2, wherein the display device enters, for a period of time, a lower power state after the user manually activates the switch.

6. The apparatus as in claim 2, wherein the apparatus does not include an RF receiver.

7. A golf club comprising:
    a grip;
    a shaft coupled to the grip, the shaft coupled to a surface, the surface configured to contact a golf ball;
    a switch coupled to one of the grip or the shaft, wherein the switch is physically disposed on one of the grip or the shaft;
    a memory in an RFID circuit;
    a transmitter coupled to the switch and coupled to the memory, wherein the transmitter transmits, directly in response to a user activation of the switch in a first manner before or after a stroke:
        an identifier of the golf club, the identifier stored in the memory, and
        a command to a golf data collection system, the command causing the golf data collection system to register the stroke, directly in response to the user activation of the switch before or after the stroke, by recording information indicating that the stroke was taken using the golf club identified by the identifier, wherein recording the information includes storing a club identifier and a location on a golf course for the stroke taken, and wherein the golf data collection system registers the stroke, in response to the manual activation, regardless of whether the stroke was actually taken, and
    wherein the switch is further configured to cancel the recording of the stroke when the switch is activated manually in a second manner.

8. The golf club as in claim 7, further comprising a display device coupled to one of the grip or the shaft, the display device configured to remind the user to manually activate the switch before or after the stroke to cause the golf data collection system to register the stroke.

9. The golf club as in claim 8 further comprising:
    a solar energy source coupled to the display device to provide power to the display device; and
    a battery coupled to the provide power to the transmitter.

10. The golf club as in claim 9 further comprising:
    logic coupled to the switch and to the transmitter, the logic configured to determine whether a user activation of the switch indicates that the stroke is to be canceled or recorded.

11. The golf club as in claim 8, wherein the display device enters, for a period of time, a lower power state after the user activates the switch.

12. A golf data collection system comprising:
    a golf data collection apparatus comprising:
        a radio location receiver configured to receive at least one radio frequency (RF) signal from which a location of the radio location receiver can be determined,
        a data collection receiver configured to receive a first signal from a transmitter on a golf club, the first signal indicating a request to record a stroke taken using the golf club, and the data collection receiver being configured to receive a second signal from the transmitter, the second signal indicating a request to cancel the request to record, and a processor coupled to the radio location receiver and coupled to the data collection receiver and coupled to a storage device, the processor being configured to store, in the storage device, stroke data indicating that the stroke was taken using the golf club at the location, if the second signal is not received, wherein the stroke data includes a club identifier of the golf club and the location on a golf course for the stroke taken; and a golf club comprising:

a grip;

a shaft coupled to the grip, the shaft coupled to a surface, the surface configured to contact a golf ball;

a transmitter coupled to one of the shaft or the grip, wherein the transmitter is configured to transmit the first signal and the second signal;

a button disposed on one of the shaft or the grip, wherein the transmitter is activated by the button to send the first signal and the second signal;

a switch coupled to one of the grip or the shaft, the switch being coupled to the button, wherein when the button is activated manually in a first manner by a golfer holding the golf club before or after the stroke, the switch activates the transmitter to transmit the first signal, directly in response to the manual activation of the button by the golfer before or after the stroke, to cause the processor to record the stroke, directly in response to the manual activation of the button by the golfer before or after the stroke, wherein recording the stroke includes storing the stroke data including the club identifier and the location on the golf course for the stroke taken, wherein the golf data collection apparatus registers the stroke, in response to the manual activation, regardless of whether the stroke was actually taken, and wherein when the button is activated manually in a second manner by the golfer holding the golf club before or after the stroke, the switch activates the transmitter to transmit the second signal to cause the processor to cancel the recording of the stroke.

13. An apparatus for collecting golf data, the apparatus comprising:

a substrate to attach the apparatus to a golf object;

a transmitter coupled to the substrate;

a memory coupled to the transmitter, wherein the memory and the transmitter form an RFID that is disposed on the golf object when the substrate is attached to the golf object;

a button configured to be pressed by a user;

a switch coupled to the transmitter and coupled to the button, the switch, when activated by the user pressing the button in a first manner before or after an action with the golf object, causing the transmitter to transmit, directly in response to the user pressing the button before or after the action with the golf object:

an identifier of the golf object, the identifier stored in the memory, and a command to a golf data collection system, the command causing the golf data collection system to register the action with the golf object, directly in response to the user pressing the button before or after the action with the golf object, by recording information indicating that an action was taken using the golf object, wherein recording the information indicating that the action was taken includes storing the club identifier and the location on the golf course for the stroke taken, and wherein the golf data collection apparatus registers the action taken, and wherein the switch is further configured to cancel the recording of the stroke when the switch is activated manually in a second manner.

14. The apparatus as in claim 13, further comprising:

logic coupled to the switch and to the transmitter, the logic configured to determine whether a user activation of the switch indicates that the action with the golf object is to be canceled or recorded.

15. The apparatus as in claim 13, wherein the apparatus includes an RF receiver.

16. The apparatus as in claim 13, wherein the apparatus does not include an RF receiver.

17. The apparatus as in claim 13, wherein the apparatus is integrated into the golf object at a time of manufacture of the golf object.

* * * * *